United States Patent [19]
Okamoto et al.

[11] Patent Number: 4,677,622
[45] Date of Patent: Jun. 30, 1987

[54] ERROR CORRECTION METHOD AND SYSTEM

[75] Inventors: Hiroo Okamoto; Masaharu Kobayashi, both of Yokohama; Keizo Nishimura, Yokosuka; Takaharu Noguchi, Yokohama; Takao Arai, Yokohama; Toshifumi Shibuya, Yokohama, all of Japan

[73] Assignee: Hitachi, Ltd., Tokyo, Japan

[21] Appl. No.: 622,711

[22] Filed: Jun. 20, 1984

[30] Foreign Application Priority Data

Jun. 22, 1983 [JP] Japan ................................. 58-110931
Jul. 20, 1983 [JP] Japan ................................. 58-130839
Nov. 11, 1983 [JP] Japan ................................. 58-210858

[51] Int. Cl.$^4$ ............................................. G06F 11/10
[52] U.S. Cl. ............................................................ 371/39
[58] Field of Search ............................. 371/39, 40, 38

[56] References Cited

U.S. PATENT DOCUMENTS

| | | | |
|---|---|---|---|
| 4,413,340 | 11/1983 | Odaka et al. | 371/39 |
| 4,437,185 | 3/1984 | Sako et al. | 371/39 |
| 4,541,093 | 9/1985 | Furuya et al. | 371/40 |
| 4,546,474 | 10/1985 | Sako et al. | 371/39 |

*Primary Examiner*—Charles E. Atkinson
*Attorney, Agent, or Firm*—Antonelli, Terry & Wands

[57] ABSTRACT

This invention relates to an error correction upon reproduction of digital signals. The error correction is performed by decoding code words such as cross-interleaved Reed Solomon codes, in which first code blocks are formed by a plurality of information words which are in the first arrangement state and a plurality of first check words which are produced by codes associated with the plurality of information words with a Hamming distance of $d_1$, and second code blocks are formed by a plurality of information words and a plurality of first check words which are in the second arrangement state and which consist of the said plurality of information words and the said plurality of first check words which are respectively included in the different first code blocks, and by a plurality of second check words which are produced by codes associated with the plurality of information words and the plurality of first check words with a Hamming distance of $d_2$. At the first decoding stage, errors are detected and at the same time the flags indicative of the decoding states are added with respect to the second code blocks. At the second decoding stage, in accordance with the contents of the flags and on the basis of a combination of $p_2$ and $q$ selected from their combinations satisfying $2p_2 + q \leq d_1 - 1$, errors are detected and errors of $p_2$ words are corrected and erasures of $q$ words to which the flags were added are corrected with respect to the first code blocks.

5 Claims, 30 Drawing Figures

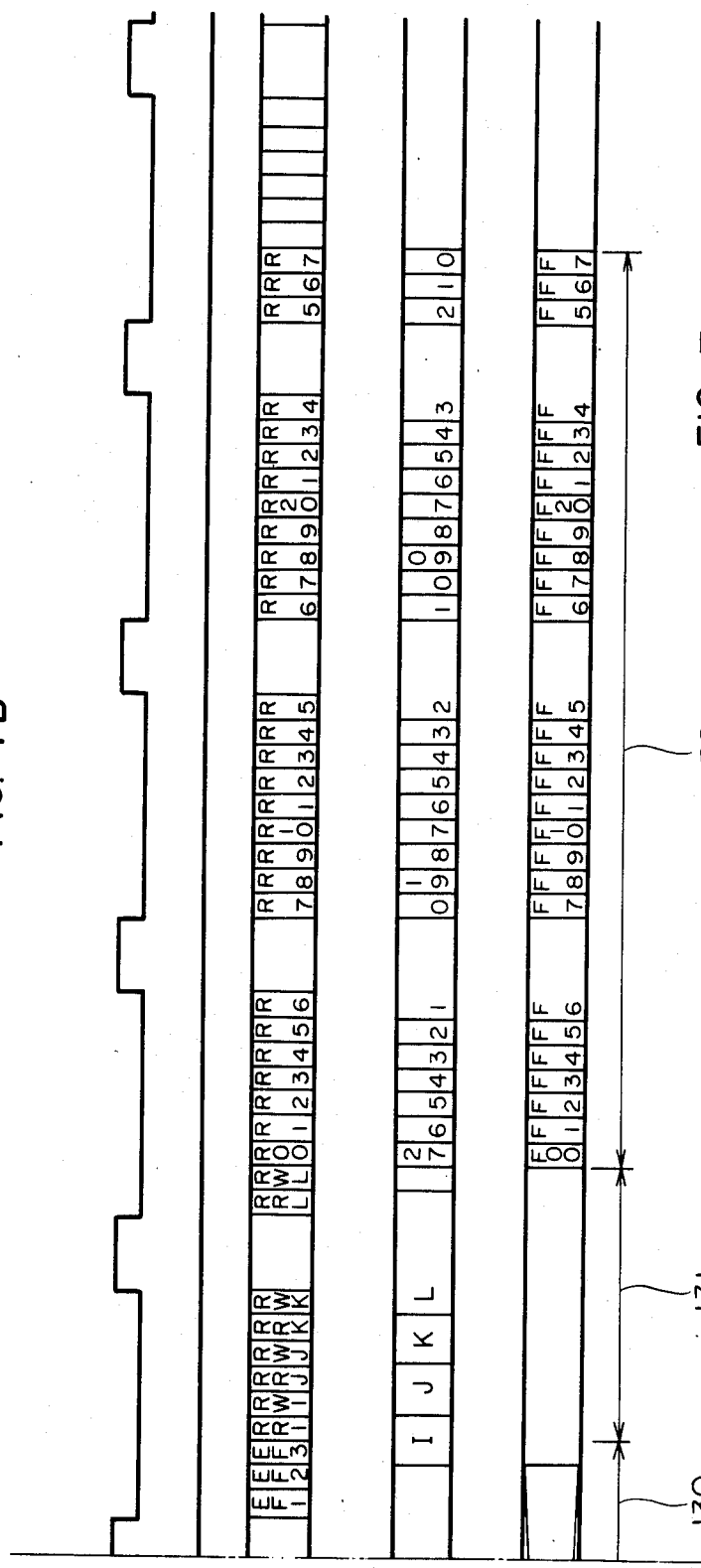

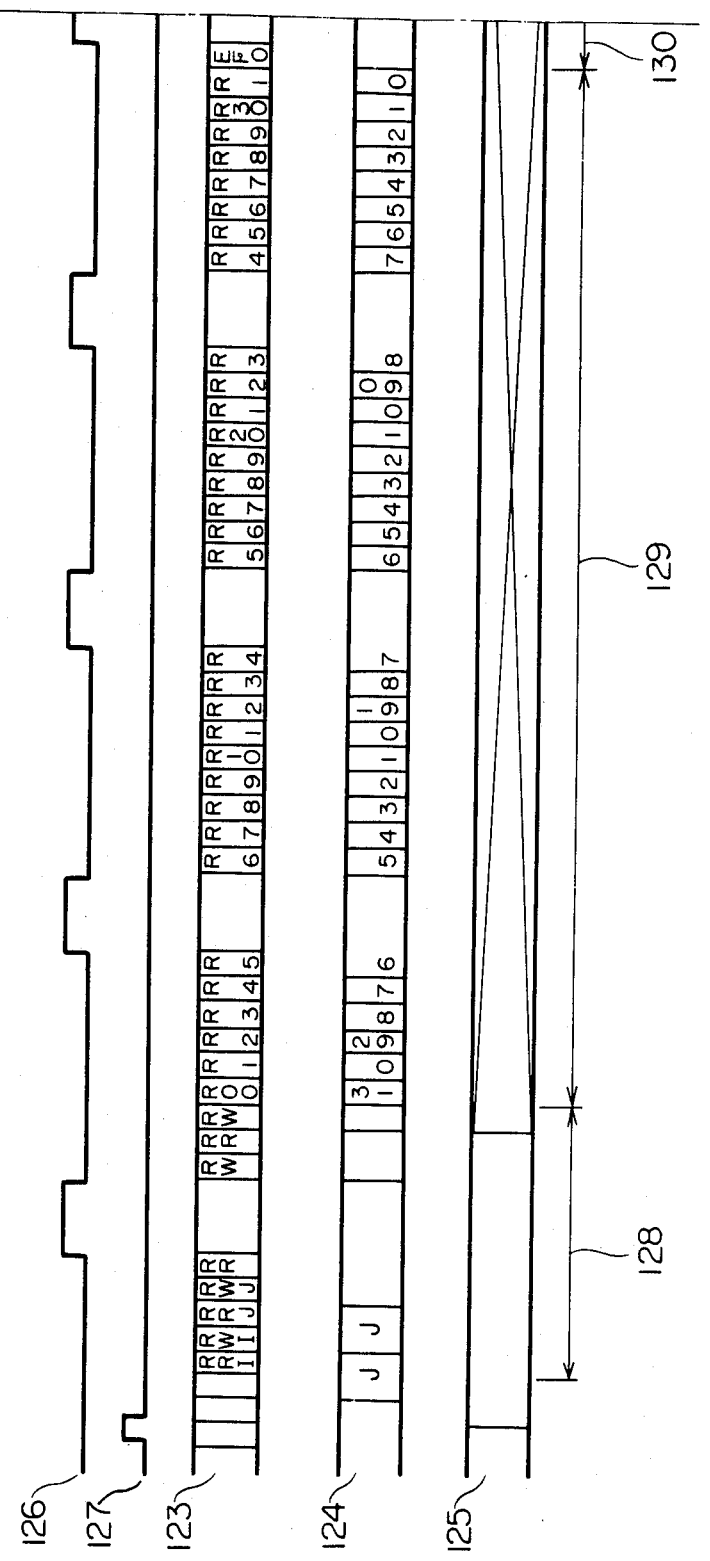

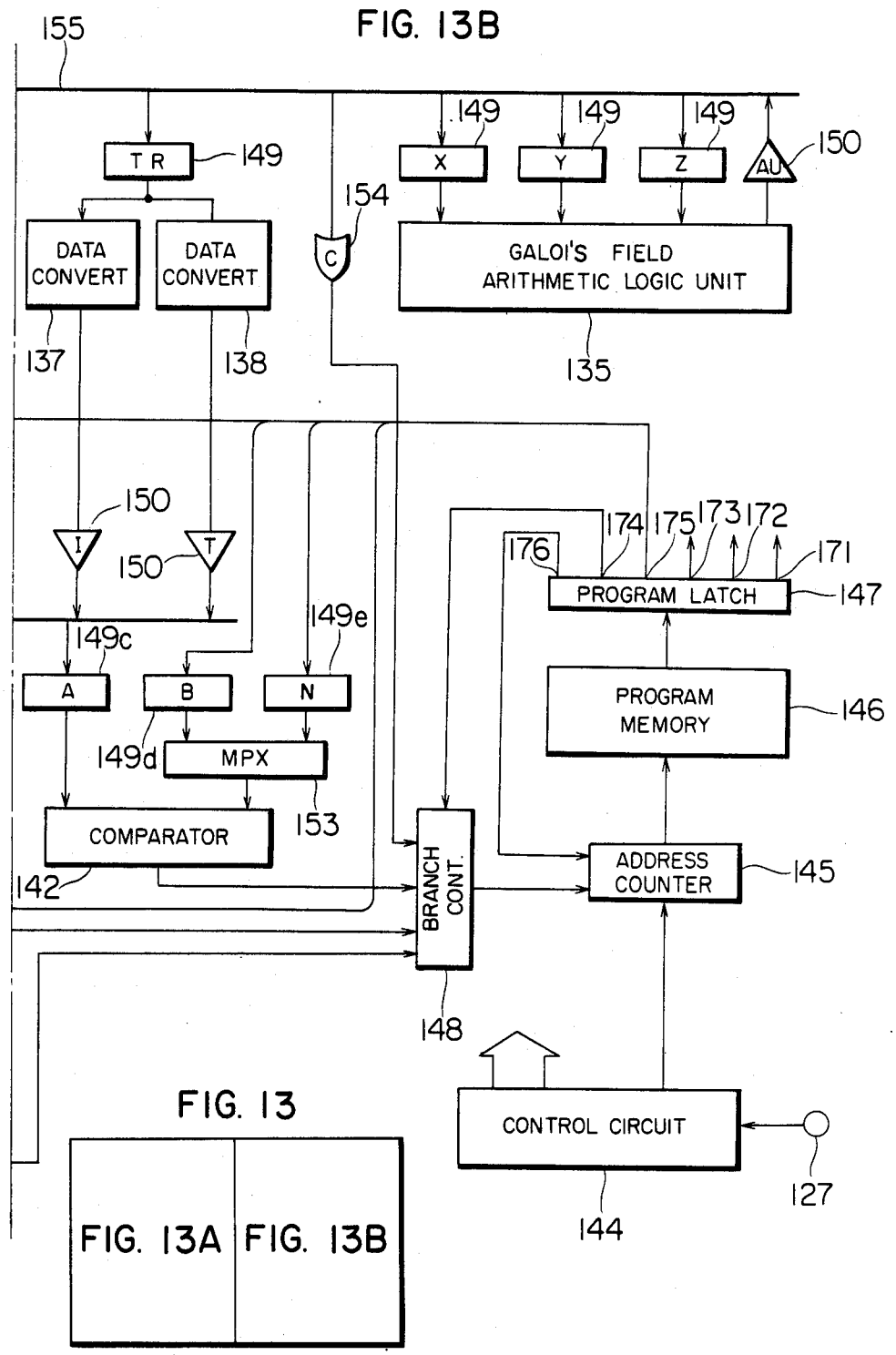

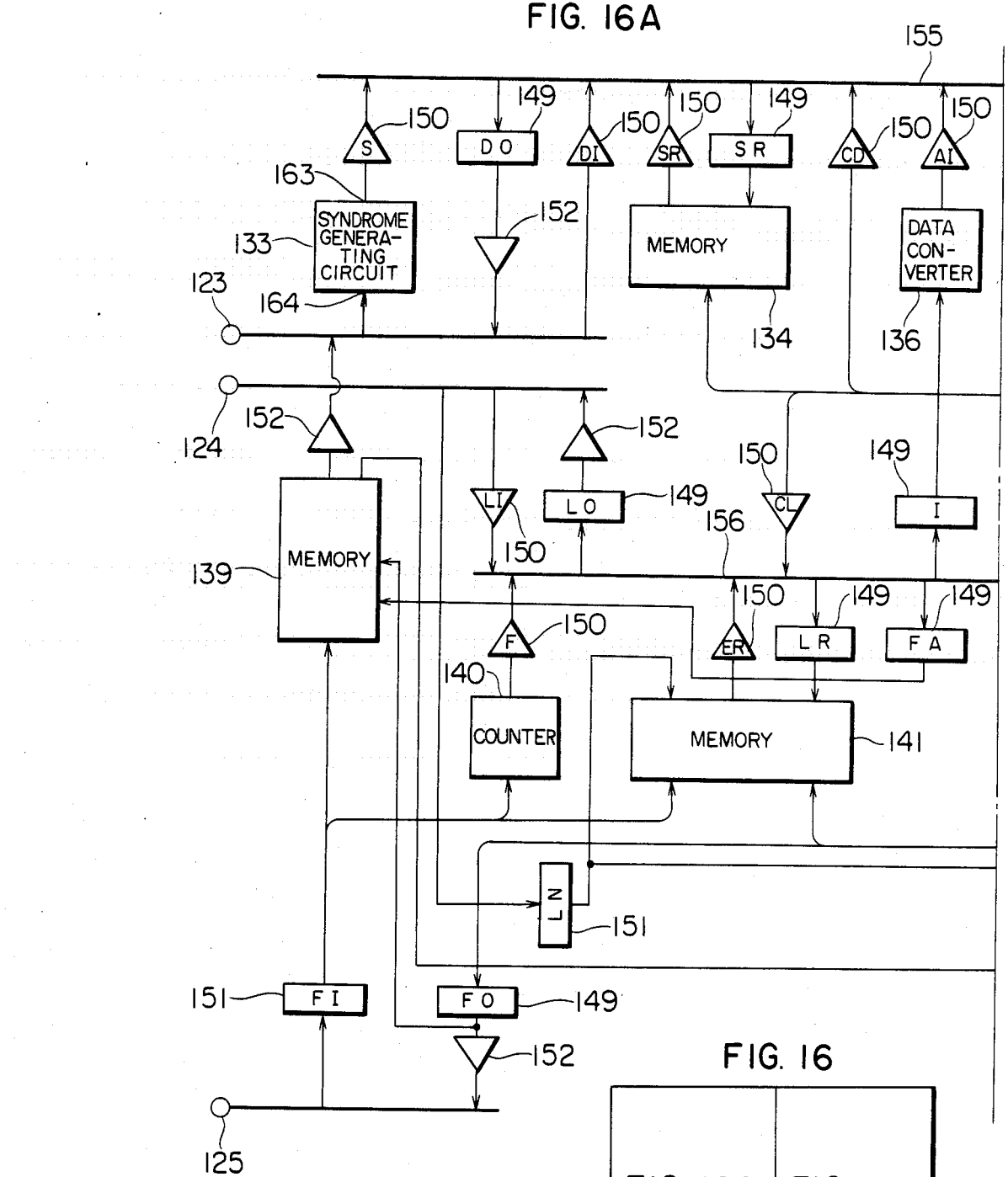

ERROR CORRECTION METHOD AND SYSTEM

The present invention relates to error correction in an apparatus for reproducing a digital signal and, more particularly, to an error correction method and a system which are suitable for decoding code words having a number of check words, such as in the decoding of Reed Solomon Codes.

In case of transmitting or recording a digital signal such as by a PCM recorder, the occurrence of error data in the transmission system becomes a problem. Therefore, check words are added when transmitting or recording and the error data is corrected using those check words upon reception or reproduction. As the check words, BCH codes and the like which have good efficiency and can be easily decoded are used. Particularly, Reed Solomon codes as one type of the BCH codes are usually used as the block codes. Further, cross-interleave codes are known as a method of increasing the correcting capability by performing double encoding by the use of these codes.

FIGS. 1 and 2 show well-known examples of an encoding circuit and a decoding circuit for the cross-interleave Reed Solomon codes (hereinbelow, abbreviated as CIRC codes), which circuits are respectively disclosed in GB No. 2076569A (Odaka et al, U.S. Pat. No. 4,413,340), and in BG No. 2079993A (Sako et al, U.S. Pat. No. 4,437,185). In FIG. 1, numerals 1 and 2 denote encoders; 3, 4 and 5 indicate interleave circuits; and 6 represents a data inverting circuit. In FIG. 2, numerals 7 and 8 denote decoders; and 9, 10 and 11 are deinterleave circuits.

In the CIRC codes, the double encoding by the use of Reed Solomon codes is performed. In the coding circuit of FIG. 1, after the first interleave was performed by the interleave circuit 3 with respect to 24 information words, check words $Q_1$, $Q_2$, $Q_3$ and $Q_4$ of four words are added by the encoder 1. Further, after the second interleave was performed by the interleave circuit 4 with regard to the code block of 28 words consisting of the 24 information words and four check words, check words $P_1$, $P_2$, $P_3$, and $P_4$ of four words are added by the encoder 2. The code block of 32 words consisting of 24 information words and eight check words is further subjected to the third interleave processing by the interleave circuit 5, and thereafter they are converted to serial data and this data is then transmitted or recorded. In addition, the check words are inverted by the data inverting circuit 6 for prevention of misdetection or miscorrection when sequential data is lost.

In the decoding circuit of FIG. 2, after the deinterleave corresponding to the above-mentioned third interleave was performed by the deinterleave circuit 9 and after the check words were again inverted by a data inverting circuit 6′, the first decoding is done by the decoder 7. In this first decoding, the error detection and error correction by use of the check words $P_1$ to $P_4$ are executed. The 24 information words and four check words to which the error detection and error correction were done by the decoder 7 are deinterleaved by the deinterleave circuit 10 corresponding to the foregoing second interleave, thereafter they are subjected to the second decoding by the decoder 8. In this second decoding, the error detection and error correction are performed by use of the check words $Q_1$ to $Q_4$. The 24 information words to which the error detection and error correction were done by the decoder 8 are deinterleaved by the deinterleave circuit 11 corresponding to the above-mentioned first interleave, then they are outputted.

In the method of performing the double encoding such as in the CIRC codes, the correcting capability can be raised by performing the decoding twice or more times by use of two different code blocks ($P_1$-$P_4$; $Q_1$-$Q_4$). The technology for raising the error correction capability is disclosed in GB No. 2079993A (U.S. Pat. No. 4,437,185 issued Mar. 13, 1984). However, in the conventional decoding method, only one or two words are corrected in the first decoding $C_1$ and the second decoding $C_2$, so that the correcting capability which the codes inherently have is not sufficiently made the most of. Also, the optimum decoding method in accordance with the state of flag upon the first decoding is not employed in the second decoding.

It is an object of the present invention to provide an error correction method and a system which can make the most of the error correcting capability which the codes inherently have in order to solve such problems.

The fundamental concept of the present invention is that in case of correcting the errors of p-words in the codes having a Hamming distance of d and in case of correcting the erasures of q-words in the same codes, plural decoding methods so as to satisfy the relation $$2p+q=d-1$$

are used, thereby enabling the error correcting capability which the codes inherently have to be made the most of. The above decoding method is implemented by an error correcting system using programs.

In the accompanying drawings:

FIGS. 7, 7A and 7B show a timing chart for error correction;

FIGS. 13, 13A and 13B show one embodiment of the error correcting system of the invention;

FIGS. 16, 16A and 16B show another embodiment of the error correcting system of the invention;

Figure 1:
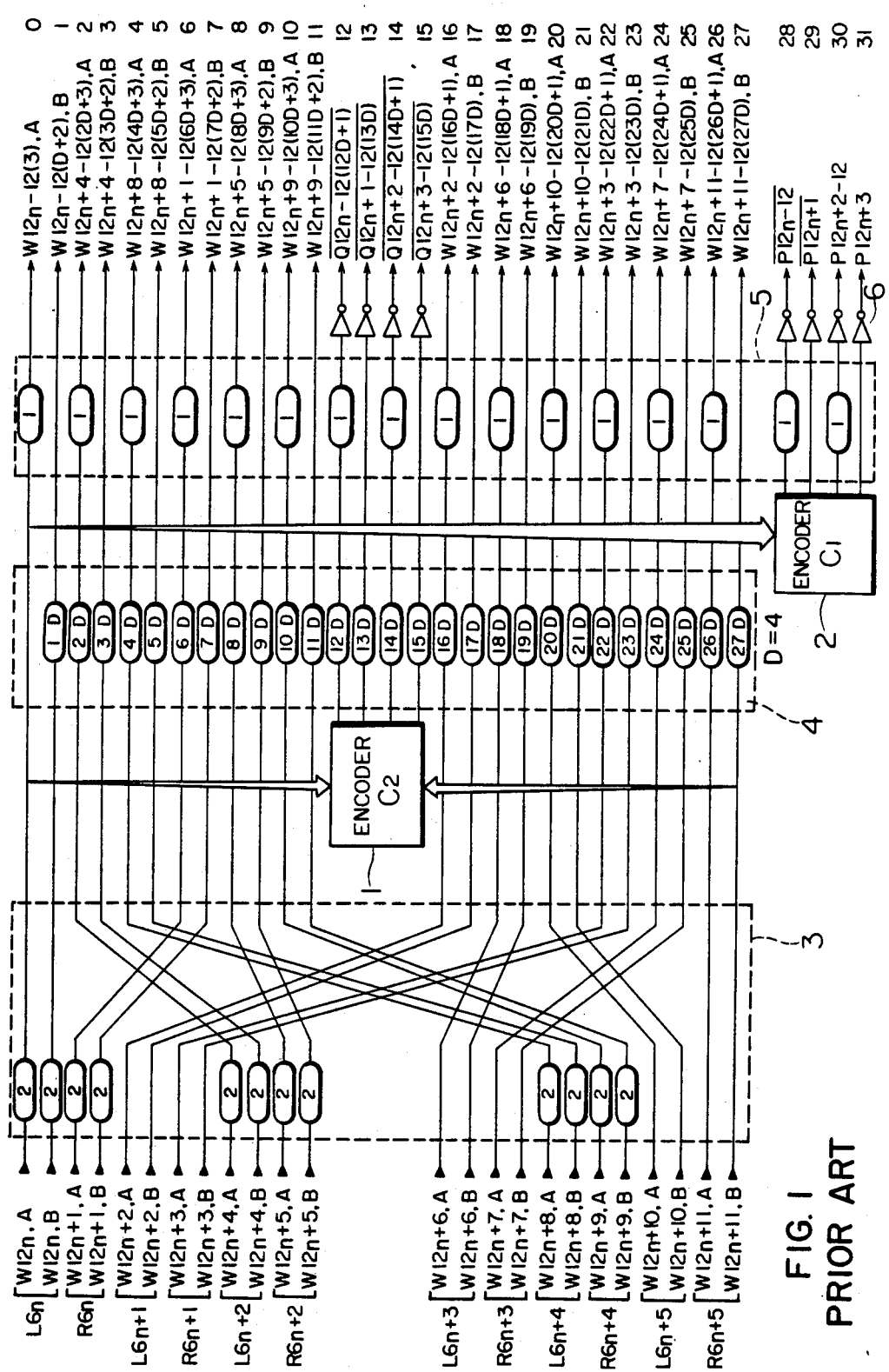
FIG. 1 is a diagram showing a prior art coding circuit for the CIRC codes.
Figure 2:
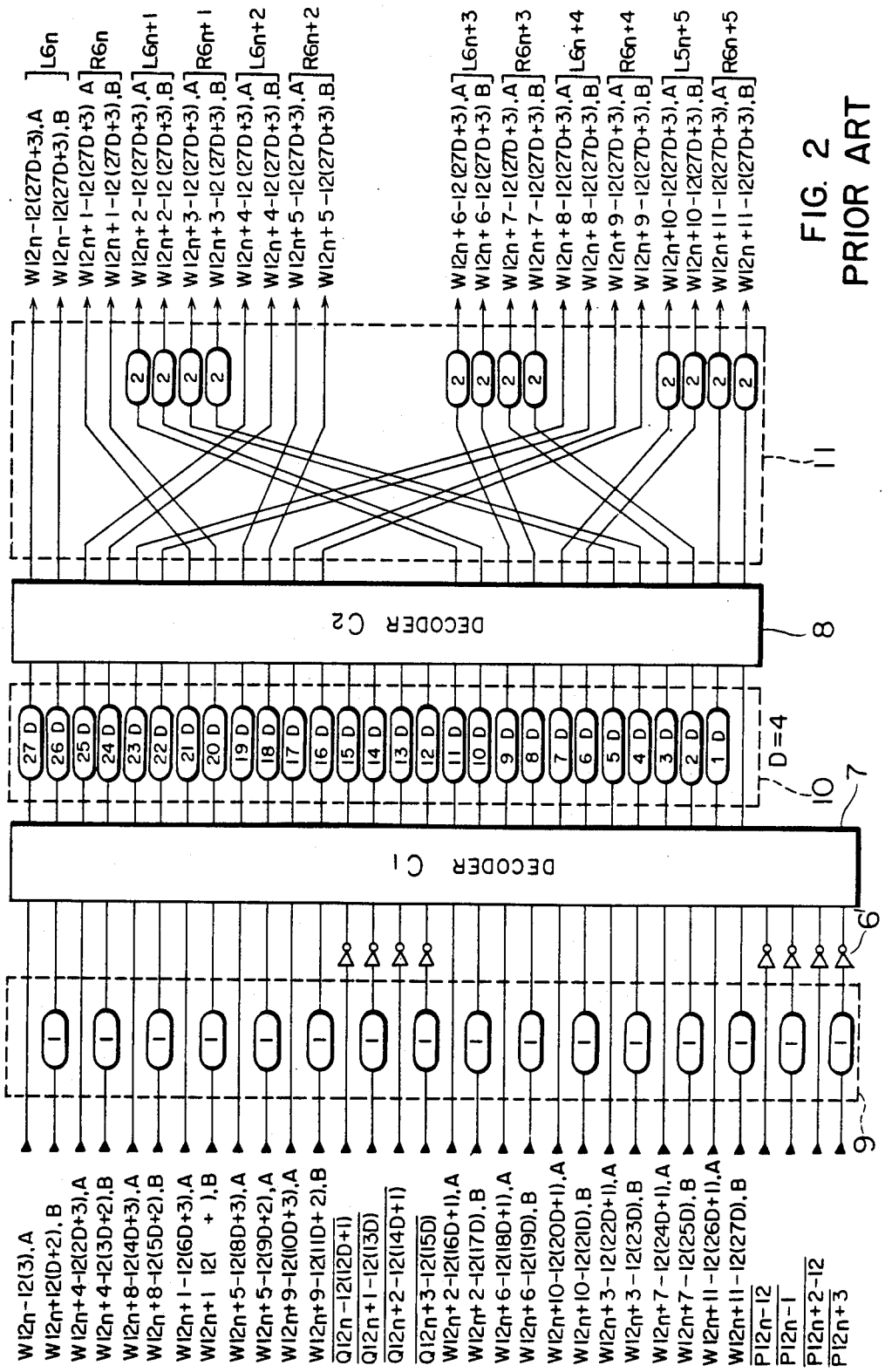
FIG. 2 is a diagram showing a prior art decoding circuit for the CIRC codes.

It will be described hereinbelow the case where one embodiment of the present invention is employed for the foregoing CIRC codes.

In the decoding of the CIRC codes, it is necessary to decode the Reed Solomon codes over Galois field GF ($2^8$) in which the code length is 32 words and the number of check words is four in the first decoding, and over GF ($2^8$) in which the code length is 28 words and the number of check words is four in the second decoding.

First, the Reed Solomon codes defined over Galois field GF ($2^8$) and a method of decoding the same will be described.

Assuming that one of the roots of the eighth-order irreducible polynomial F(x) over GF ($2^8$) is $\alpha$, the set $\{0, 1, \alpha, \alpha^2, \ldots, \alpha^{254}\}$ of which the ($2^8-2$) elements which are represented by the power of $\alpha$ were added to the elements of GF (2) constitutes GF ($2^8$). When a certain positive integer is t in GF ($2^8$), the Reed Solomon codes are the codes in which the code length $n=(2^8-1)$ and the number of information words is $(n-2t)$ and the number of check words is $2t$ and which use the following generating polynomial, $$g(x)=(x+1)(x+\alpha)(x+\alpha^2)\ldots(x+\alpha^{2t-1}),$$

or $$g(x)=(x+\alpha)(x+\alpha^2)(x+\alpha^3)\ldots(x+\alpha^{2t}) \quad (1)$$

Namely, in the Reed Solomon codes, the polynomial expression $$C(x)=C_0+C_1x+C_2x^2+\ldots+C_{n-1}x^{n-1} \quad (2)$$

of the code word $C=\{C_0, C_1, \ldots, C_{n-1}\}$ can be divided by g(x). This is represented as the following expression.

$$C(x) \equiv 0 \pmod{g(x)} \quad (3)$$

The word length n can be reduced within a range of $$2^8-1 \geq n > 2t$$

A Hamming distance d is (2t+1) in these Reed Solomon codes.

When it is now assumed that the reception (reproduction) signal regarding the code word C(x) represented by expression (2) is $$R(x)=r_0+r_1x+\ldots+r_{n-1}x^{n-1} \quad (4)$$

and that $\nu$ errors $$E(x) = \sum_{j=1}^{\nu} e_{ij}x^{ij} \ (0 \leq i, \nu \leq n-1) \quad (5)$$

occurred in this reception (reproduction) signal, $$R(x) = C(x) + E(x) \quad (6)$$

$$\equiv E(x) \pmod{g(x)}$$

The errors E(x) can be obtained by syndromes $S_k$ represented by the following expression.

$$S_k = R(\alpha^k) \quad (7)$$

$$= \sum_{j=1}^{\nu} e_{ij}\alpha^{ij \cdot k}$$

$$(0 \leq k \leq 2t - 1 \text{ or } 1 \leq k \leq 2t)$$

As the decoding procedure, the error location polynomial $$\sigma(x) = \prod_{i=1}^{\nu} (x + \alpha^{ij}) \quad (8)$$

$$= x^\nu + \sigma_1 x^{\nu-1} + \ldots + \sigma_{\nu-1}x + \sigma_\nu$$

is first obtained from the syndromes $S_k$ and by obtaining its roots, the error locations $i_1, i_2, \ldots, i_\nu$ can be known. Since $\sigma(\alpha^{ij})=0$ from expression (8), $$\sum_{j=1}^{\nu} e_{ij}\alpha^{ij \cdot k}\sigma(\alpha^{ij}) = 0$$

By adding the above expression with respect to $0 \leq k \leq 2t-1$ (or $1 \leq k \leq 2t$), $$S_i\sigma_\nu + S_{i+1}\sigma_{\nu-1} + \ldots \\ +S_{i+\nu-1}\sigma_1 + S_{i+\nu} = 0 (0 \leq i \leq 2t-1-\nu \text{ or } \\ 1 \leq i \leq 2t-\nu) \quad (9)$$

is satisfied. The error locations $\sigma_i$ can be obtained by solving expression (9). Further, by obtaining these error locations $\sigma_i$ and error values $e_{i1}, e_{i2}, \ldots e_{i\nu}$ from expression (7) to obtain E(x), the error correction can be performed by $$C(x)=R(x)+E(x) \quad (10)$$

In the codes having a Hamming distance of d, it is possible to correct the p errors and the q erasures within a range of $$2p+q \leq d-1$$

Since the Hamming distance is (2t+1) in the Reed Solomon codes, the error correction can be performed within a range of $$2p+q \leq 2t$$

Next, a practical example of the decoding method will be shown with respect to the Reed Solomon codes in which t=2 and the number of information words is (n−4), the number of check words is four, and the generating polynomial is $$g(x)=(x+1)(x+\alpha)(x+\alpha^2)(x+\alpha^3) \quad (11)$$

The syndromes $S_0$, $S_1$, $S_2$ and $S_3$ in this case are as follows.

$$\begin{cases} S_0 = R(1) \\ S_1 = R(\alpha) \\ S_2 = R(\alpha^2) \\ S_3 = R(\alpha^3) \end{cases} \quad (12)$$

When no error is detected, the following relation will be obviously satisfied.

$$S_0 = S_1 = S_2 = S_3 = 0$$

In the case where the error of one word (error location is set to i) is detected, $$\begin{cases} S_0\sigma_1 + S_1 = 0 \\ S_1\sigma_1 + S_2 = 0 \\ S_2\sigma_1 + S_3 = 0 \end{cases} \quad (13)$$

from expression (9).
Therefore, $$\sigma_1 = S_1/S_0 = S_2/S_1 = S_3/S_2$$

In addition, since $$\sigma(x) = x + \alpha^i$$
$$= x + \sigma_1$$

the error location i is obtained by $$\alpha^i = S_1/S_0 \quad (14)$$

The error value in this case will be $$e_i = S_0 \quad (15)$$

from expression (7).
In the case where the errors of two words (error locations are set to $i_1$ and $i_2$) are detected, $$\begin{cases} S_0\sigma_2 + S_1\sigma_1 + S_2 = 0 \\ S_1\sigma_2 + S_2\sigma_1 + S_3 = 0 \end{cases} \quad (16)$$

from expression (9).
By solving the above expression, $$\begin{cases} \sigma_1 = \dfrac{S_1 S_2 + S_0 S_3}{S_1^2 + S_0 S_2} \\ \sigma_2 = \dfrac{S_1 S_3 + S_2^2}{S_1^2 + S_0 S_2} \end{cases}$$

will be obtained. Therefore, the error location polynomial will be $$\sigma(x) = x^2 + \dfrac{S_1 S_2 + S_0 S_3}{S_1^2 + S_0 S_2} x + \dfrac{S_1 S_3 + S_2^2}{S_1^2 + S_0 S_2} \quad (17)$$

By solving $\sigma(x) = 0$ with regard to expression (17), $\alpha^{i_1}$ and $\alpha^{i_2}$ are obtained, so that the error locations $i_1$ and $i_2$ can be derived. In addition, from expression (7), $$\begin{cases} S_0 = e_{i1} + e_{i2} \\ S_1 = \alpha^{i1} e_{i1} + \alpha^{i2} e_{i2} \end{cases} \quad (18)$$

Therefore, error values $e_{i1}$ and $e_{i2}$ can be derived from $$\begin{cases} e_{i1} = \dfrac{\alpha^{i2} S_0 + S_1}{\alpha^{i1} + \alpha^{i2}} \\ e_{i2} = \dfrac{\alpha^{i1} S_0 + S_1}{\alpha^{i1} + \alpha^{i2}} \end{cases} \quad (19)$$

In the case where the errors of three words (error locations are set to $i_1$, $i_2$ and $i_3$) are detected, from expression (9), $$S_0\sigma_3 + S_1\sigma_2 + S_2\sigma_1 + S_3 = 0 \quad (20)$$

will be obtained.
Also, $$\sigma(x) = (x + \alpha^{i1})(x + \alpha^{i2})(x + \alpha^{i3}) \quad (21)$$

thus, $$\begin{cases} \sigma_1 = \alpha^{i1} + \alpha^{i2} + \alpha^{i3} \\ \sigma_2 = \alpha^{i1+i2} + \alpha^{i2+i3} + \alpha^{i3+i1} \\ \sigma_3 = \alpha^{i1+i2+i3} \end{cases} \quad (22)$$

Consequently, if the error locations $i_1$ and $i_2$ are known, $$\alpha^{i3} = \dfrac{S_1 A_1 + S_2 A_2 + S_3}{S_0 A_1 + S_1 A_2 + S_2} \quad (23)$$

will be obtained from expressions (20) and (22).
However, the third error location $i_3$ can be obtained from $$A_1 = \alpha^{i1+i2}, \quad A_2 = \alpha^{i1} + \alpha^{i2}$$

In addition, from expression (7), $$\begin{cases} S_0 = e_{i1} + e_{i2} + e_{i3} \\ S_1 = \alpha^{i1} e_{i1} + \alpha^{i2} e_{i2} + \alpha^{i3} e_{i3} \\ S_2 = \alpha^{2i1} e_{i1} + \alpha^{2i2} e_{i2} + \alpha^{2i3} e_{i3} \end{cases} \quad (24)$$

Therefore $$\begin{cases} e_{i3} = (S_0 A_1 + S_1 A_2 + S_2)/A_3 \cdot A_4 \\ e_{i2} = (S_0 \alpha^{i1} + S_1 + D e_{i3})/A_3 \\ e_{i1} = S_0 + e_{i2} + e_{i3} \end{cases} \quad (25)$$

However, the error values $e_{i1}$, $e_{i2}$ and $e_{i3}$ can be obtained from $$A_3 = \alpha^{i2} + \alpha^{i3}, \quad A_4 = \alpha^{i3} + \alpha^{i1}$$

In the case where the errors of four words (error locations are set to $i_1$, $i_2$, $i_3$ and $i_4$) are detected, from expression (7), $$\begin{cases} S_0 = e_{i1} + e_{i2} + e_{i3} + e_{i4} \\ S_1 = \alpha^{i1}e_{i1} + \alpha^{i2}e_{i2} + \alpha^{i3}e_{i3} + \alpha^{i4}e_{i4} \\ S_2 = \alpha^{2i1}e_{i1} + \alpha^{2i2}e_{i2} + \alpha^{2i3}e_{i3} + \alpha^{2i4}e_{i4} \end{cases} \quad (26)$$

Therefore, if the error locations $i_1$ to $i_4$ are known, $$\begin{cases} e_{i4} = C_3/B_3 \\ e_{i3} = (C_2 + B_2 e_{i4})/A_3 \cdot A_4 \\ e_{i2} = (C_1 + A_4 e_{i3} + B_1 e_{i4})/A_2 \\ e_{i1} = S_0 + e_{i2} + e_{i3} + e_{i4} \end{cases} \quad (27)$$

where $B_1 = \alpha^{i1} + \alpha^{i4}$ $B_2 = B_1(\alpha^{i2} + \alpha^{i4})$ $B_3 = B_2(\alpha^{i3} + \alpha^{i4})$ $C_1 = S_0 \alpha^{i1} + S_1$ $C_2 = C_1 \alpha^{i2} + S_1 \alpha^{i1} + S_2$ $C_3 = C_2 \alpha^{i3} + S_1 \alpha^{i1+i2} + S_2(\alpha^{i1} + \alpha^{i2}) + S_3$ As described above, as the method of decoding the Reed Solomon codes having four check words, three kinds of methods are available:
(a) correction of two or less errors;
(b) correction of two or less erasures and one error; and
(c) correction of four or less erasures.

The error correction can be efficiently performed by use of the combination of these decoding methods.

In the CIRC codes, the number of check words is four and the Hamming distance is five. Thus, as described above, it is possible to correct the errors of p words and the erasures of q words within a range of $2p + q \leq 4$ In the first decoding, the error locations are uncertain. Therefore, $q=0$, $p=1$ or 2, and it is possible to correct the errors of up to two words. Namely, for the first decoding, four kinds of cases are considered: (i) where it is determined that no error is detected; (ii) where one word is corrected; (iii) where two words are corrected; and (iv) where it is determined that the correction is impossible since there are errors of three or more words. Therefore, the following flags are considered as the flags representing the states of the first decoding.

|  | No error | 1 word correction | 2 words correction | uncorrectable | reliability |
|---|---|---|---|---|---|
| $F_0$ | 0 | 1 | 1 | 1 | large |
| $F_1$ | 0 | 0 | 1 | 1 | medium |
| $F_2$ | 0 | 0 | 0 | 1 | small |

In the first decoding, the error correction is performed and, at the same time such flags are added to each word. The reason why a plurality of flags are added in this way is that probabilities of misdetection and miscorrection which are caused upon decoding differ in dependence upon the respective cases. As the correcting capability is higher, the probabilities of misdetection and miscorrection become larger. Assuming that these probabilities are $P(F_i)$, $P(F_0) < P(F_1) < P(F_2)$ Therefore, by adding the flags indicative of a plurality of states in the first decoding, it is possible to perform the error correction with excellent correcting and detecting capabilities in the second decoding.

In the second decoding, the error locations can be detected by use of the flags added in the first decoding. Consequently, the following three kinds of correcting methods are considered.

$$\begin{cases} p = 0, q \leq 4 \\ p = 1, q \leq 2 \\ p = 2, q = 0 \end{cases}$$

In the case where $p=0$ and $q \leq 4$, the errors of up to four words to which the flags were added can be corrected. Although this method has the highest correcting capability, if there are errors to which no flags are added due to the misdetection or miscorrection in the first decoding in the correction block, miscorrection will have occurred. Thus, it is necessary to use, as the error flag, the flag such as $F_0$ of which the probability of misdetection and miscorrection is low. On the other hand, in the case where the number of correction words is smaller than three, the detecting capability can be raised due to the checking of syndromes or by other correcting method.

In the case where $p=1$ and $q \leq 2$, it is possible to correct errors of up to three words consisting of the errors of up to two words to which the flags were added and an arbitrary one word error. In this case, the error of one word to which no flag is added can be corrected. In addition, in the case where there are three (or less) words as the words to which the flags were added, the detecting capability can be raised by use of the method whereby the two words (or one word) among them are regarded as errors (whose error locations are known) and the error location of the remaining one word is detected and its result is checked to see if it coincides with the location of the flag or not.

When $p=2$ and $q=0$, arbitrary errors of up to two words can be corrected. In such a case, even if there are errors to which no flag is added, the errors of up to two words can be corrected. Also, by checking the error location detected whether it coincides with the flag location or not, the detecting capability can be raised.

Figure 3:
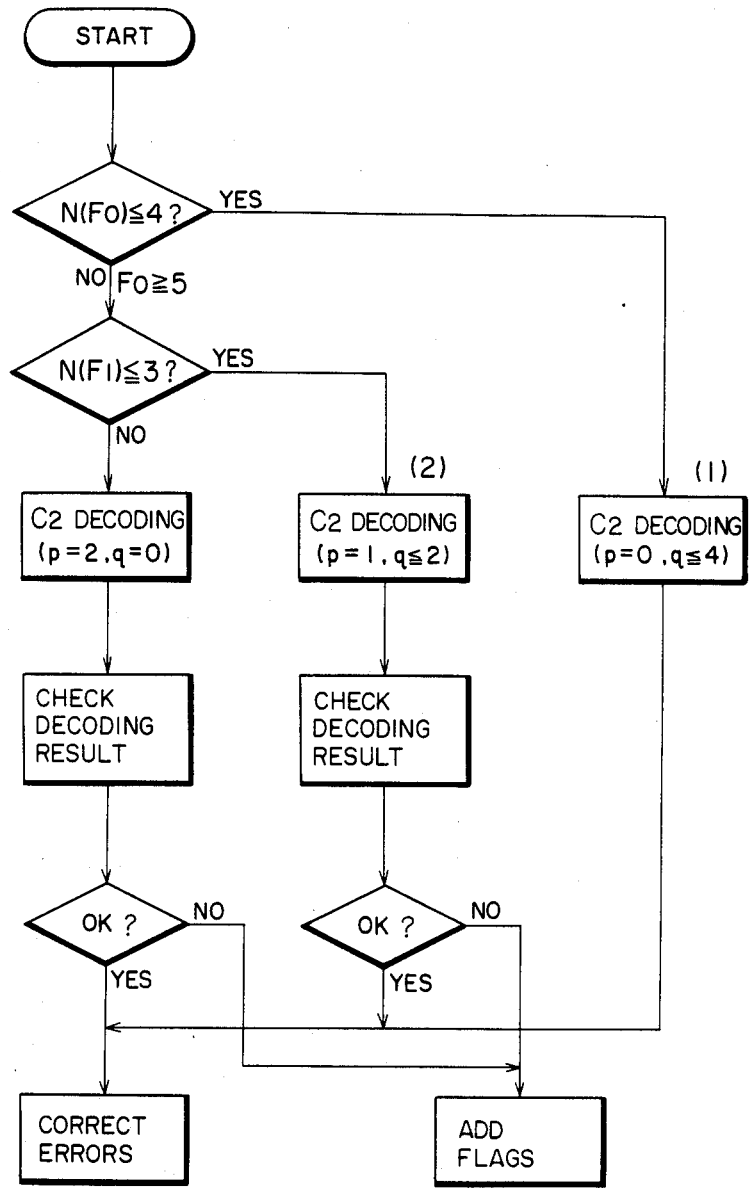
FIG. 3 is a schematic flowchart showing the second decoding procedure for the CIRC codes according to the invention.

An example of application of the above-described three kinds of decoding methods in the second decoding $C_2$ will now be explained in accordance with the flowchart shown in FIG. 3.

(1) When the number of $F_0$ flags is four or less, the words to which the flags were added are regarded as the error words and the error correction of four or less words is performed. On the other hand, when the number of $F_0$ flags is three or less, the detecting capability can be improved by detecting the errors to which no flag is added by other decoding method.

(2) In the case where the number of $F_0$ flags is five or more and the number of $F_1$ flags is three or less, the two words (or one word) to which the $F_1$ flags were added are regarded as the error words and the error location of one word is detected. In the case where the error location detected coincides with the location of the $F_1$ flag or where no error is detected, the error correction of three or less words is performed.

(3) In the case where the number of $F_0$ flags is five or more and the number of $F_1$ flags is four or more, the error locations of up to two words are detected. When the $F_1$ flag was added to the error location detected, the error correction of two or less words is performed.

In addition, the error detecting capability can be improved by further finely checking in dependence upon the states of the $F_2$ flags.

Figure 4B:
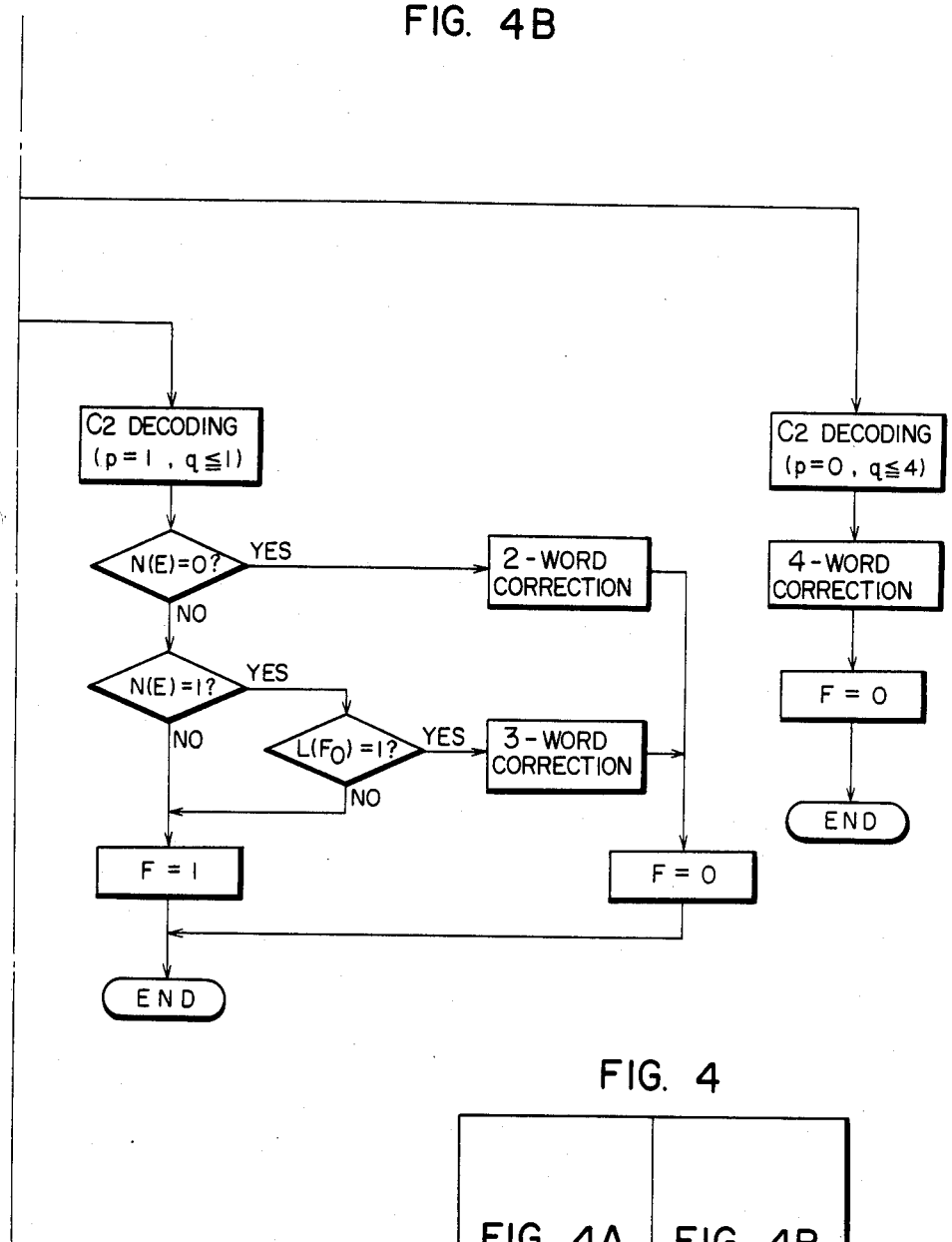
FIGS. 4, 4A, 4B and 5, 5A, 5B show detailed flowcharts of FIG. 3.
Figure 4:
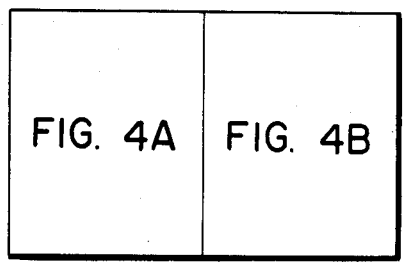
Figure 4A:
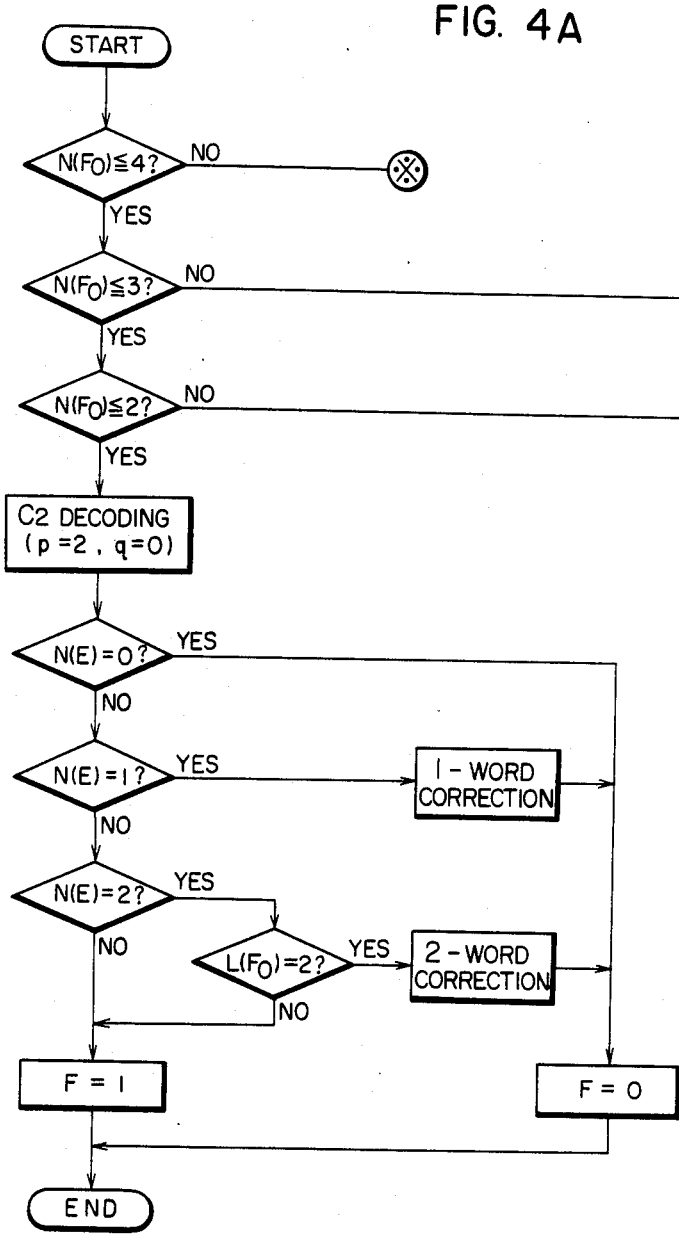
Figures 5, 5A:
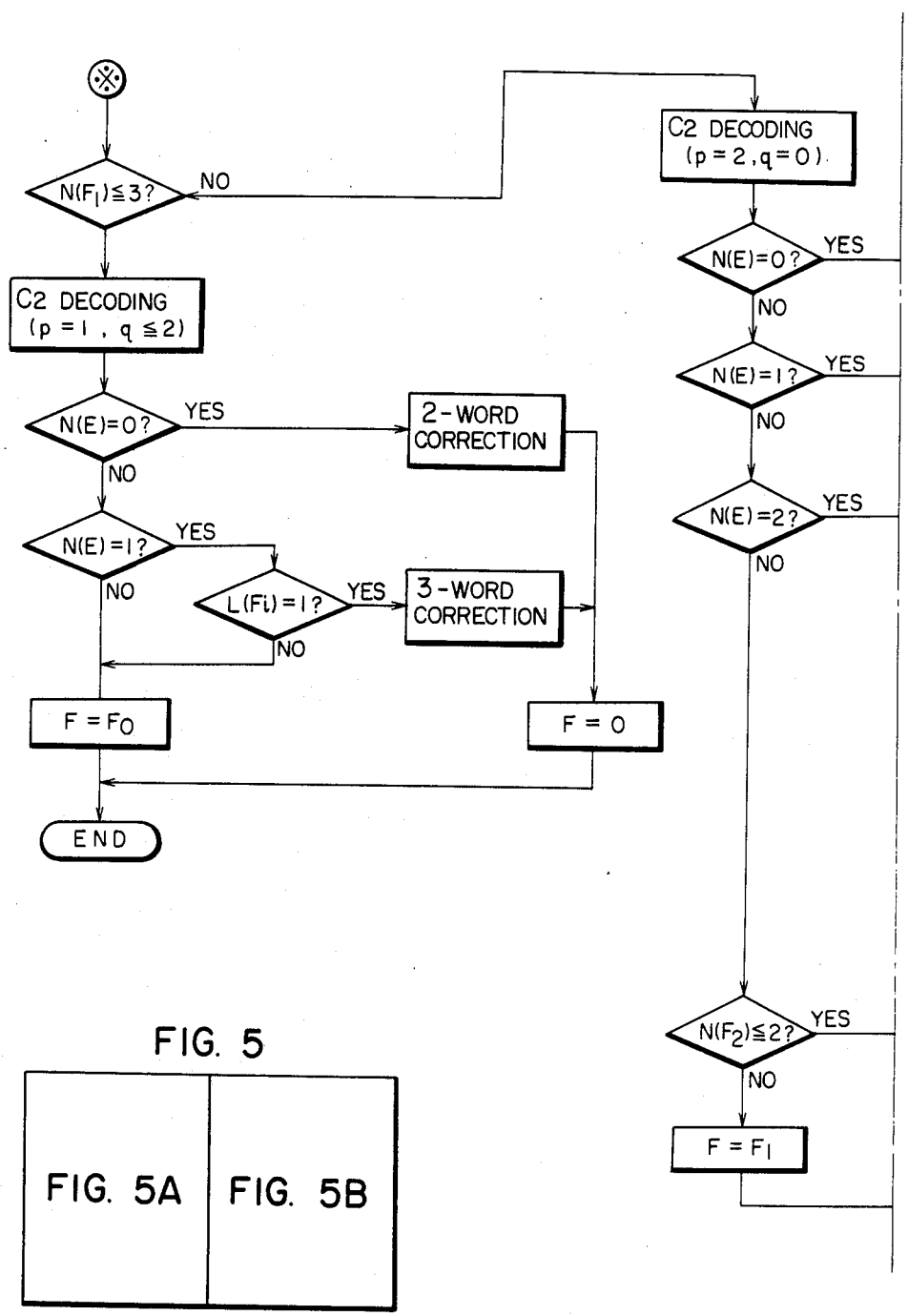
Figure 5B:
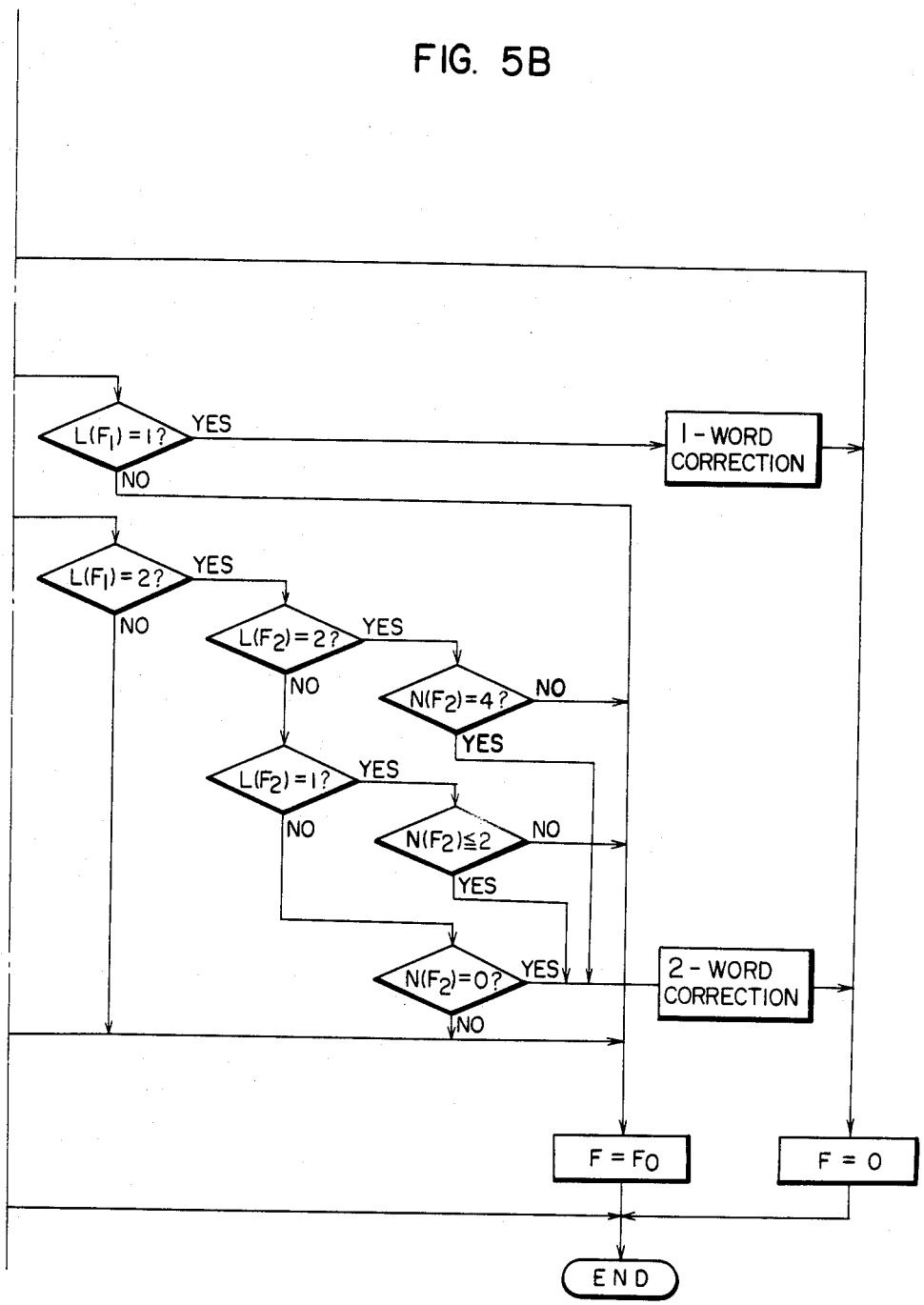

The details of the flowchart for the second decoding are shown in FIGS. 4A, 4B and 5A, 5B. In the chart, $N(F_0)$, $N(F_1)$ and $N(F_2)$ respectively indicate the numbers of words to which the $F_0$ flag, $F_1$ flag and $F_2$ flag were added; $N(E)$ denotes the number of errors detected by the decoding; and $L(N_0)$, $L(F_1)$ and $L(F_2)$ represent the numbers of words to which the respective flags were added among the error locations detected. A practical decoding method in the $C_2$ decoding will be explained hereinbelow with reference to FIGS. 4 and 5.

(1) The syndromes $S_0$, $S_1$, $S_2$ and $S_3$ and the numbers of flags $N(F_0)$, $N(F_1)$ and $N(F_2)$ are calculated.

(2) $N(F_0)$ and $N(F_1)$ are checked for determination with respect to which decoding should be performed.

(3) The decoding is done on the basis of the decoding method determined in the above step (2). If the correction is possible, the error correction is performed. On the other hand, if the correction is impossible, the error correction flag F is added.

(I) Values of the syndromes are first checked upon decoding where $p=2$ and $q=0$. When $$S_0=S_1=S_2=S_3=0,$$

it is determined that there is no error ($N(E)=0$). In addition, when $$S_1/S_0=S_2/S_1=S_3/S_2,$$

it is determined that there is an error of one word ($N(E)=1$), thereby performing the decoding on the basis of expressions (13) and (14). In other cases, the decoding is done on the basis of expressions (17) to (19). When the error locations $i_1$ and $i_2$ are correctly obtained, it is determined that there are errors of two words ($N(E)=2$). On one hand, when $i_1$ and $i_2$ are not obtained, it is determined that there are errors of three or more words ($N(E)>2$). In case of one-word error or two-word errors, the checking is carried out by use of $L(F_0)$, $L(F_1)$ and $N(F_2)$. The error correction is executed only when the probability of miscorrection is small.

(II) Upon decoding where $p=1$ and $q\leq 2$, it is first determined that the words to which the flags were added are located in the error locations $i_1$ and $i_2$, thereby calculating expression (23). Also, in determination of $i_1$ and $i_2$, the word to which the $F_2$ flag was added has a priority. When both denominator and numerator are 0 in expression (23), it is determined that there is no error ($N(E)=0$) excluding $e_{i1}$ and $e_{i2}$. When the error location $i_3$ is correctly obtained in other location than those, it is determined that there is an error of one word ($N(E)=1$) other than $e_{i1}$ and $e_{i2}$. In the case where $i_3$ cannot be obtained, it is determined that there are errors of two or more words other than $e_{i1}$ and $e_{i2}$ ($N(E)>1$). When $N(E)\leq 1$, the error value is obtained from expression (25). When $N(E)=0$, the two-word correction is performed. When $N(E)=1$, $L(F_i)$ is checked in the manner as follows. When $L(F_i)=1$, the three-word correction is done.

| $N(F_1)$ | $N(F_2)$ | $F_i$ |
|---|---|---|
| 3 | 3 | $F_2$ |
| 3 | $\leq 2$ | $F_1$ |
| $\leq 2$ | $\leq 2$ | $F_0$ |

(III) In the decoding where $p=0$ and $q\leq 4$, it is determined that the words to which the flags were added are located in the error locations $i_1$, $i_2$, $i_3$ and $i_4$, thereby obtaining the error values from expression (27) and performing the four-word correction.

(IV) In the case where the correction is impossible, when $F=1$, the uncorrectable flag is added to every word. When $F=F_0$, the uncorrectable flag is added to only the word to which the $F_0$ flag was added. When $F=F_1$, the uncorrectable flag is added to only the word to which the $F_1$ flag was added.

(4) With respect to the words to which the uncorrectable flags were added, the error concealment is performed upon reproduction by means of mean value interpolation or the like.

According to the above-described decoding methods, it is possible to correct the errors of up to three or four words, so that the correcting capability can be raised as compared with the conventional method whereby the error correction of up to two words is done. In addition, the error correcting capability can be also raised by the use of an optimum decoding method in accordance with the state of the flag. For this purpose, selection of such an optimum decoding method is made such that both (a) the error correcting capability determined from the probability of addition of flags and that of failure of error detection at the first decoding and the probability of failure of error correction and that of failure of error detection at the second decoding and (b) the error detection capability are enhanced thereby.

Further, the error correcting method of invention can be also applied to other decoding than the CIRC codes, for example, to the case where the cyclic codes (CRC codes) are used for production of the second check words and only the error detection is performed in the first decoding.

Next, an embodiment whereby the error correcting system of the invention is applied to the decoding of the CIRC codes will be described.

Figure 6:
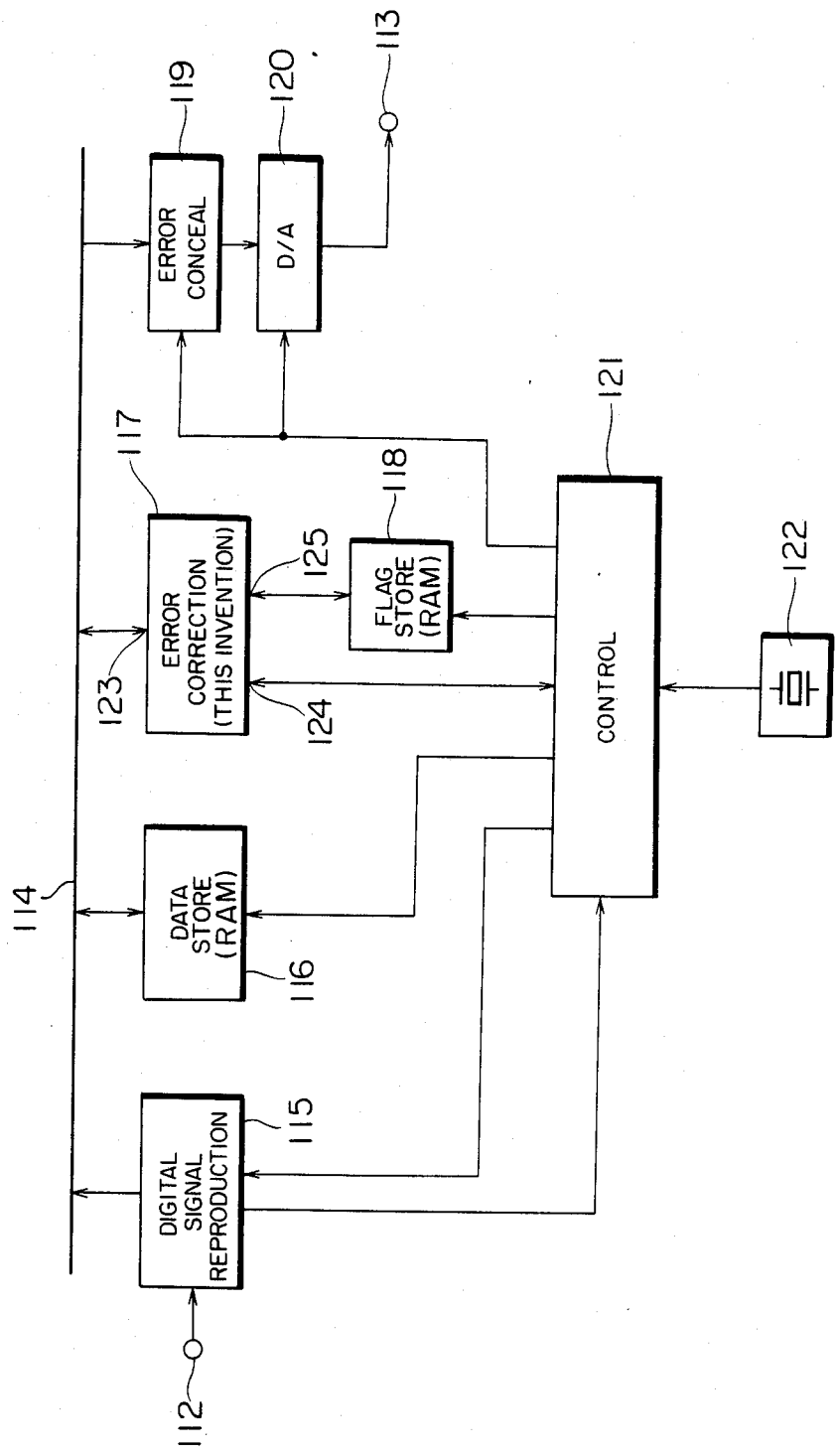
FIG. 6 is a block diagram showing a reproducing apparatus in which a system according to an embodiment of the present invention is incorporated.

FIG. 6 shows a block diagram of the reproducing apparatus, in which a reference numeral 115 denotes a digital signal reproducing circuit; 116 is a data storing circuit; 117 an error correcting system according to the present invention; 118 a flag storing circuit; 119 an error concealing circuit; 120 a D/A converter; and 121 a control circuit. The digital signal reproducing circuit 115 reproduces the digital signal from the reproduction signal input from an input terminal 112 and outputs it to a bus line 114, and at the same time it detects the sync signal in the reproduction signal and outputs it to the control circuit 121. The data storing circuit 116 temporarily stores the digital signal reproduced and an RAM is generally used. The deinterleave is performed by controlling the write addresses and read addresses of this storing circuit 116. The error correcting system 117 performs the first decoding and the second decoding. Also, the flag storing circuit 118 temporarily stores the flags added on a frame unit basis by the first decoding and an RAM is generally used. The error concealing circuit 119 conceals, by means of mean value interpolation or the like, the words which were determined to be uncorrectable in the second decoding which is carried out by the error correcting system 117. The digital signal is converted to the analog signal by the D/A converter 120 and is outputted to an output terminal 113. The control circuit 121 controls each section by use of the sync signals detected by the digital signal reproducing circuit and the master clock output from an oscillator 122 as a reference.

The error correcting operation by the reproducing apparatus will now be described hereinbelow with reference to the timing chart of FIGS. 7A and 7B. In the diagram, a numeral 126 denotes a data output timing to the D/A converter 120. Namely, it is necessary to perform the D/A conversion at a constant period determined by the sampling frequency irrespective of other operations. Therefore, it is necessary to execute the reception and transmission of the data among the digital signal reproducing circuit 115, error correcting apparatus 117 and data storing circuit 116 at other time than the time of outputting the data. Also, a sync signal 127 is used as a reference signal upon data input and error correction.

The data reproduced by the digital signal reproducing circuit 115 is first inputted to the data storing circuit 116 and to a data input/output terminal 123 of the error correcting system 117 in the interval indicated at 129 of FIGS. 7A and 7B. At this time, the data locations (0 to 31) corresponding to the input data are inputted to a location input/output terminal 124 of the error correcting system 117. In the error correcting system 117, the first decoding is performed in the interval 132 with regard to the data of 132 words inputted in the interval 129. Then, the data stored in the data storing circuit 116 is corrected in the interval 128 in the next frame using the decoded result. In addition, the flag data is outputted from a flag input/output terminal 125 and is stored in the flag storing circuit 118.

The data which is subjected to the second decoding is inputted in the interval 132. Namely, the data of 28 words is inputted from the data storing circuit 116 in the interval 128. At this time, the data locations (0 to 27) corresponding to the input data are inputted to the location input/output terminal 124. The second decoding is performed in the interval 129 in the next frame. The data stored in the data storing circuit 116 is corrected in the interval 131 in the next frame using the decoded result. In addition, the uncorrectable flag which is used when the correction is impossible in the second decoding is outputted in the interval 130. This uncorrectable flag is written in the location of the data storing circuit 116 where the check words have been written and is read out simultaneously when the data is outputted to the D/A converter. In the case where the uncorrectable flag is added to the data, the error concealment is performed by the error concealing circuit 119.

In this way, by simultaneously performing the data input and decoding operation in the error correcting system 117, the data transferring operation and decoding operation can be carried out at a low speed.

Next, another embodiment whereby the error correcting system of the invention is employed for the CIRC codes will be described.

Figure 8:
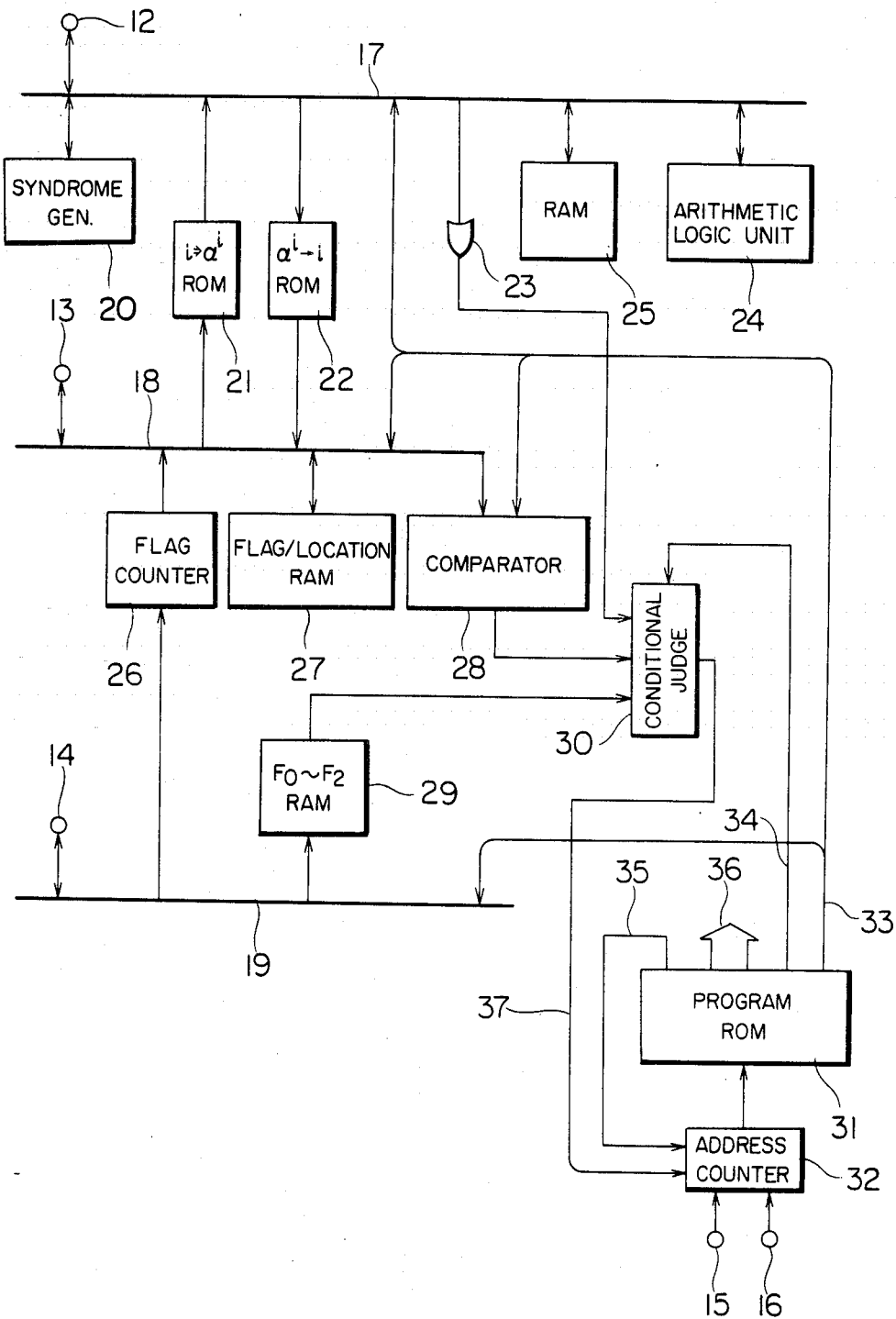
FIG. 8 is a block diagram of an error correction system according to an embodiment of the invention.

FIG. 8 shows a block diagram of the error correcting system. In the diagram, numerals 17 to 19 denote bus lines; 20 is a syndrome generating circuit; 21 and 22 are ROMs; 25, 27 and 29 are RAMs; 24 an arithmetic logic circuit; 26 a counter; 28 a comparator; 30 a conditional judging circuit; 31 a program ROM; and 32 an address counter.

This circuit comprises: the three bus lines; the circuits connected to these bus lines; and a control circuit for controlling the operations of the respective circuits in accordance with the program. The bus line 17 is the data bus for reception and transmission of the reception signal and data such as error patterns and the like. The bus line 18 is the location bus for reception and transmission of the data such as the locations of the data and the like. The bus line 19 is the flag bus for reception and transmission of the data regarding the flags which are added to the data. In addition, a data input/output terminal 12, a location input/output terminal 13 and a flag input/output terminal 14 are connected to each bus, respectively.

Figure 9:
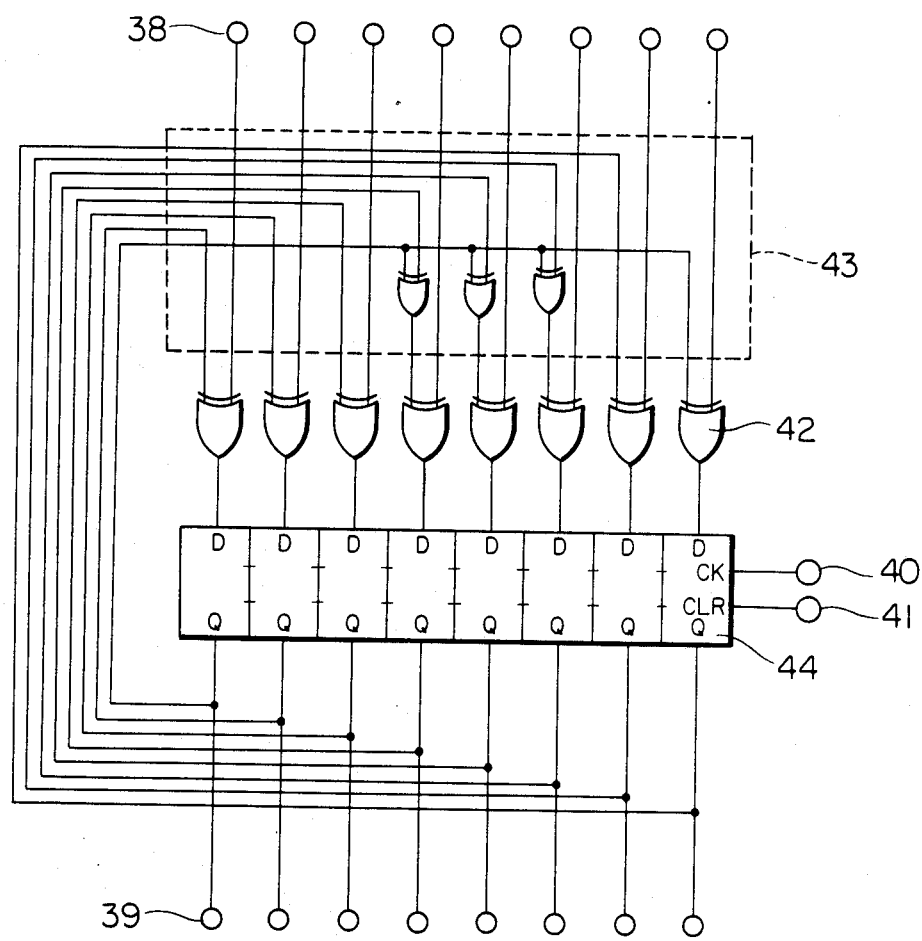
FIG. 9 is a diagram showing a syndrome generating circuit.

The syndrome generating circuit 20 produces the syndromes $S_0$ to $S_3$ on the basis of the reception signals inputted from the data input/output terminal 12. The syndrome generating circuit 20 is constituted by circuits as shown in FIG. 9. In FIG. 9, a numeral 42 is an EOR circuit and 44 is an eight-bit latch. Also, a numeral 43 is a matrix arithmetic logic circuit: in which the product of "1" and the input signal is outputted from the $S_0$ forming circuit; the product of "$\alpha$" and the input signal is outputted from the $S_1$ generating circuit, the product of "$\alpha^2$" and the input signal is outputted from the $S_2$ generating circuit; and the product of "$\alpha^3$" and the input signal is outputted from the $S_3$ generating circuit. An example of the $S_1$ generating circuit is shown in FIG. 9. A reception signal is inputted to an input terminal 38 of this circuit and a clock signal synchronized with the reception signal is inputted to a clock input terminal 40 of the latch 44, so that the syndrome is outputted from an output terminal 39 at the end of input of the reception signal. Also, a clear signal input terminal 41 is used to clear the latch before producing the syndrome.

The arithmetic logic circuit 24 serves to perform the operation to obtain the error locations and error patterns by use of the syndromes $S_0$ to $S_3$ produced by the syndrome generating circuit 20. In the arithmetic logic circuit 24, the multiplication, division and addition over $GF(2^8)$ are executed. The multiplication and division over $GF(2^8)$ of X ($=\alpha^x$) and Y ($=\alpha^y$) are as follows.

$$X \cdot Y = \alpha^{(x+y) \bmod 2^8 - 1}$$

$$X/Y = \alpha^{(x-y) \bmod 2^8 - 1}$$

Figure 10:
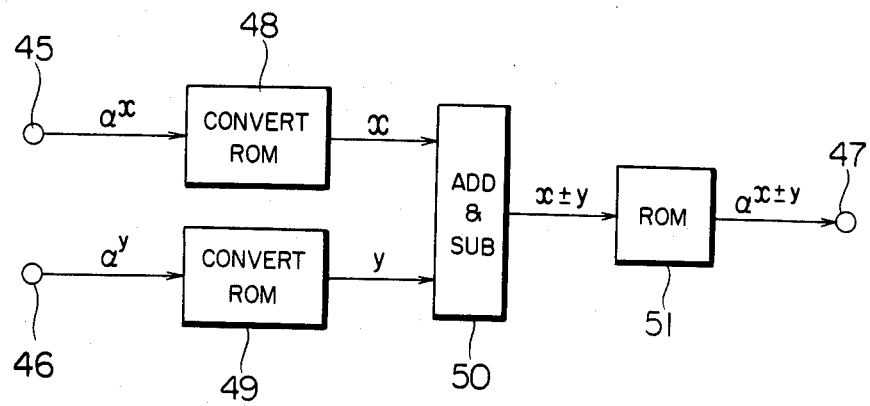
FIG. 10 is a diagram showing a multiplying/dividing circuit over GF ($2^8$)
Figure 11:
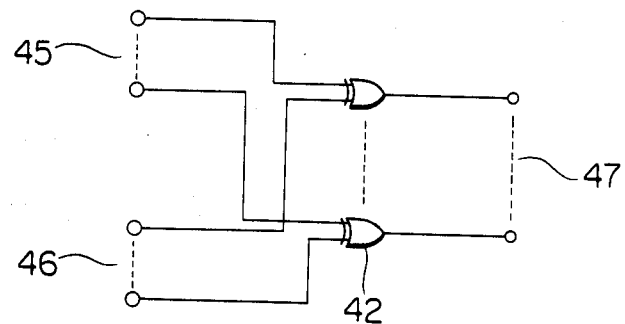
FIG. 11 is a diagram showing an adder over GF ($2^8$)

FIG. 10 shows an example of the multiplying/dividing circuit which is included in the arithmetic logic circuit 24. In the diagram, ROMs 48 and 49 respectively output x and y for X and Y which are fed to input terminals 45 and 46. An adding/subtracting circuit 50 performs the addition in case of the multiplication and performs the subtraction in case of the division. An ROM 51 outputs $\alpha^{x \pm y}$ to an output terminal 47 for the output (x±y) of the adding/subtracting circuit 50. As shown in FIGS. 10 and 11, the addition over GF ($2^8$) may be done by performing the addition of mod 2 for every bit.

The RAM 25 serves to store the syndromes $S_0$ to $S_3$ and the arithmetic operation results by the arithmetic logic circuit 24. Also, an eight-input OR circuit 23 acts to discriminate whether the data of the data bus 17 is "0" or not.

The ROMs 21 and 22 perform the conversion between i and $\alpha^i$. Although the locations of data are i=0 to 31 in the reception/transmission with the external circuits, the data is handled in the form of $\alpha^i$ in case of performing the arithmetic operation for the decoding as mentioned before. Therefore, the conversion between i and $\alpha^i$ is carried out by the ROMs 21 and 22. The ROM 21 performs the conversion from i to $\alpha^i$, while the ROM 22 performs the conversion from $\alpha^i$ to i.

The counter 26 counts the number of flags in one block. In the second decoding, the numbers of $F_0$, $F_1$ and $F_2$ are counted by the counter 26 and those numbers are compared with predetermined numbers by the comparator 28, thereby making the determination with respect to how many words are corrected, or that whether the correction is done or the uncorrectable state is set without correcting, and the like.

The RAM 27 stores the number of flags counted by the counter 26, error locations, etc. Also, the comparator 28 is used to compare the above-mentioned number of flags with a predetermined number, and the data during the decoding processing with constants.

The RAM 29 stores the flags $F_0$ to $F_2$ representing the results of the first decoding which were added to the data in the second decoding. The states of the flags stored in the RAM 29 are used to check the presence and absence of the flag at the error location obtained by the decoding.

The conditional judging circuit 30 determines the execution of branching of the program on the basis of the discrimination results by the OR circuit 23 and comparator 28 and of the states of the flags stored in the RAM 29.

Figure 12:
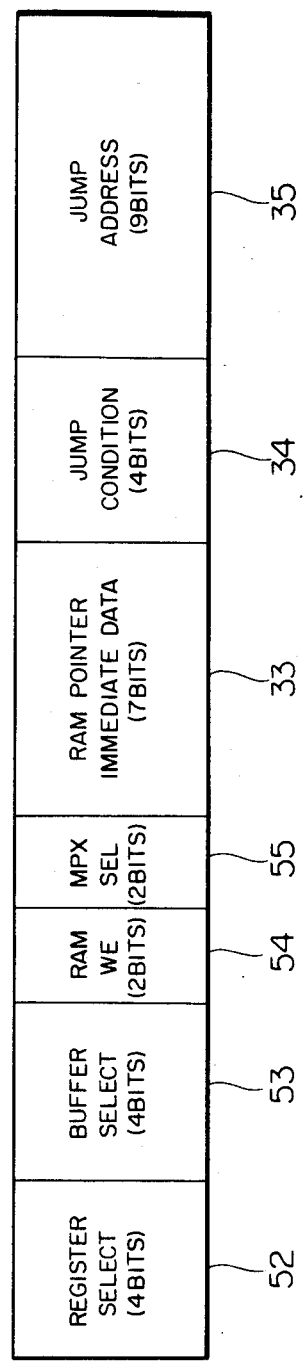
FIG. 12 is a diagram showing the program arrangement.

The program ROM 31 stores the program for decoding by control of each of the above-mentioned circuits. FIG. 12 shows a program arrangement. One word of this program consists of 32 bits. A numeral 52 is an instruction field (four bits) to select the register for storage of data among the registers included in the input section of each circuit. An instruction field (four bits) 53 is used to select the buffer for output of data among the buffers included in the output section of each circuit. The data can be transferred through the bus lines from arbitrary circuits to arbitrary circuits by the instruction fields 52 and 53. An instruction field (two bits) 54 is used to write data into the RAM 25 or 27. Since the data is written in the RAM 29 only when the reception signal is inputted, there is no need to control by the program. A two-bit instruction field 55 is used to perform the selection and the like of the multiplication and division in the arithmetic logic circuit 24. A seven-bit instruction field 33 is used to determine the addresses of RAMs and constants which are inputted to each bus line and comparator. A four-bit instruction field 34 is used to determine the jump condition of the program. In the conditional judging circuit 30, the content of the field 34 is compared with the states of the OR circuit 23, comparator 28, RAM 29, etc., thereby determining whether the jumping is performed or not. A nine-bit instruction field 35 is used to determine the jump address in case of jumping. In the circuit of the present embodiment, the CIRC codes can be decoded by a relatively short program of about 400 words.

The counter 32 acts to control the address of the program. This counter serves to advance the address of the program ROM 31 in response to the clock signal which is inputted from a master clock input 15, thereby allowing the program to be executed. In addition, in case of jumping the program, the jump address 35 is loaded to the counter by a jump instruction 37, thereby jumping the program. In addition, an input terminal 16 is used to input a signal to reset the counter 32 at the start of the program.

As procedure of performing the error correction, the reception signal is first inputted and the syndromes $S_0$ to $S_3$ are produced, and in the second decoding, the number of flags is counted and the states of the flags are stored in the RAM 29. Next, the decoding is performed by the program and the error locations and error patterns are obtained, then the error data is corrected by expression (10). In addition, in the case where the correction is impossible in the first and second decodings, the flags which are added to the data are outputted from the flag input/output terminal 14.

As described above, in the error correcting system of the present embodiment, since each circuit is controlled on the basis of the program it is also possible by merely changing the program, to cope with different error correction codes and decoding method in which the circuit scale is small.

Figure 13A:
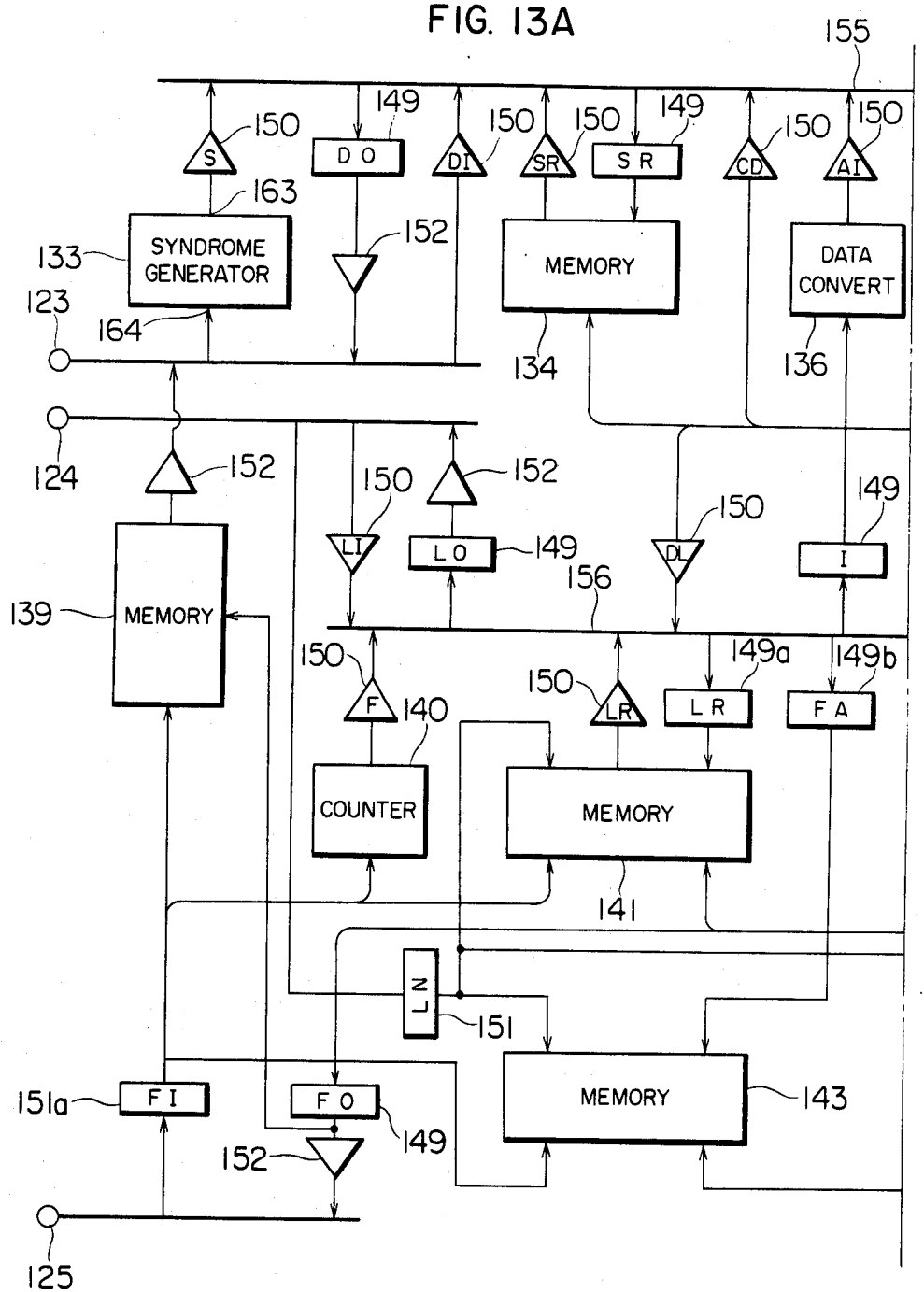

FIGS. 13A and 13B show an embodiment of the error correcting system of the present invention. In the diagram, a numeral 133 denotes a syndrome generating circuit; 134, 139, 141 and 143 are memories; 136, 137 and 138 are data converters; 135 an arithmetic logic circuit over Galois field; 140 a counter; 142 a comparator; 144 a control circuit; 145 an address counter; 146 a program memory; 147 a program latch; 148 a jump control circuit for the program; 149 and 151 are registers; and 150 and 152 are buffers.

The procedure to perform the error correction will now be explained. The reception signal is first inputted and the syndromes $S_0$ to $S_3$ are produced. Upon the second decoding, the number of flags is counted and the states of the flags are stored in the memories 139, 141 and 143. The decoding is then performed on the basis of the program and the error location and error patterns are obtained, thereby correcting the error data by expression (10). On the other hand, when the correction is impossible in the first decoding and second decoding, the flags which are added to the data are outputted from the flag input/output terminal 125.

The syndrome generating circuit 133 produces the syndromes $S_0$ to $S_3$ on the basis of the reception signal inputted from the data input/output terminal 123. The syndrome generating circuit 133 is constituted by the circuits as shown in FIG. 9. Returning again to FIG. 9, a numeral 42 is the EOR circuit and 44 is the eight-bit latch. Also, 43 denotes the matrix arithmetic logic circuit. The product of "1" and the input signal is outputted from the $S_0$ generating circuit; the product of "$\alpha$" and the input signal is outputted from the $S_1$ generating circuit; the product of "$\alpha^2$" and the input signal is outputted from the $S_2$ generating circuit; and the product of "$\alpha^3$" and the input signal is outputted from the $S_3$ generating circuit. FIG. 9 shows an example of the $S_1$ generating circuit. The reception signal is inputted to the input terminal 38 of this circuit and the clock signal synchronized with the reception signal is inputted to the clock input terminal 40 of the latch 44, so that the syndromes are outputted from the output terminal 39 at the end of inputting of the reception signal.

The counter 140 counts the number of flags in one block. In the second decoding, the numbers of $F_0$, $F_1$ and $F_2$ are counted by the counter 140. These numbers are compared with predetermined numbers by the comparator 142, thereby making the determination with respect to how many words are corrected or whether the correction is performed or the correction is determined to be impossible without performing the correction, and the like.

The memories 139 and 143 store the information regarding the flags added to the respective words. The flag information is written when the data is inputted. The information stored in the memory 143 is used to check the error locations detected by the second decoding and the locations where the flags were added. The information stored in the memory 139 is used as the uncorrectable flag in case of adding the uncorrectable flag to only the word to which the $F_0$ flag or $F_1$ flag was added in the case where the correction is impossible in the second decoding. Also, the locations (0 to 28) of the words to which the flags were added are written in the memory 141. These locations are used as the error locations when performing the decoding of $q \geq 1$ in the second decoding.

In this way, by preliminarily obtaining the information necessary upon decoding when data is inputted, the decoding time can be shortened. In addition, the writing of the flag information into the syndrome generating circuit 133, memory 139, counter 140, and memories 141 and 143 is performed by the control circuit 144 independently of the program operation which will be mentioned later. The data input and decoding operation can be therefore simultaneously executed.

The decoding is performed by the memories 134 and 141, data converters 136, 137 and 138, and arithmetic logic circuit 135.

The memory 134 stores the syndromes $S_0$ to $S_3$ produced by the syndrome generating circuit 133 and the operation result of the arithmetic logic circuit 135. The memory 141 stores the error locations and the number of flags counted by the counter 140.

The data converters 136 and 137 perform the conversion between i and $\alpha^i$. Although the data locations are i=0 to 31 in the reception and transmission with the external circuits, the data is handled in the form of $\alpha^i$ in case of performing the operation for decoding as already mentioned before. Consequently, the conversion between i and $\alpha^i$ is performed by these converters 136 and 137. The converter 136 is the ROM for converting from i to $\alpha^i$, while the converter 137 is the ROM for converting from $\alpha^i$ to i. When the corresponding relations between i and $\alpha^i$ are indicated by hexadecimal numbers, they are as follows.

| i | $\alpha^i$ | i | $\alpha^i$ | i | $\alpha^i$ | i | $\alpha^i$ |
|---|---|---|---|---|---|---|---|
| 00 | 01 | 40 | 5F | 80 | 85 | C0 | 82 |
| 01 | 02 | 41 | BE | 81 | 17 | C1 | 19 |
| 02 | 04 | 42 | 61 | 82 | 2E | C2 | 32 |
| 03 | 08 | 43 | C2 | 83 | 5C | C3 | 64 |
| 04 | 10 | 44 | 99 | 84 | B8 | C4 | C8 |
| 05 | 20 | 45 | 2F | 85 | 6D | C5 | 8D |
| 06 | 40 | 46 | 5E | 86 | DA | C6 | 07 |
| 07 | 80 | 47 | BC | 87 | A9 | C7 | 0E |

-continued

| i | $\alpha^i$ | i | $\alpha^i$ | i | $\alpha^i$ | i | $\alpha^i$ |
|---|---|---|---|---|---|---|---|
| 08 | 1D | 48 | 65 | 88 | 4F | C8 | 1C |
| 09 | 3A | 49 | CA | 89 | 9E | C9 | 38 |
| 0A | 74 | 4A | 89 | 8A | 21 | CA | 70 |
| 0B | E8 | 4B | 0F | 8B | 42 | CB | E0 |
| 0C | CD | 4C | 1E | 8C | 84 | CC | DD |
| 0D | 87 | 4D | 3C | 8D | 15 | CD | A7 |
| 0E | 13 | 4E | 78 | 8E | 2A | CE | 53 |
| 0F | 26 | 4F | F0 | 8F | 54 | CF | A6 |
| 10 | 4C | 50 | FD | 90 | A8 | D0 | 51 |
| 11 | 98 | 51 | E7 | 91 | 4D | D1 | A2 |
| 12 | 2D | 52 | D3 | 92 | 9A | D2 | 59 |
| 13 | 5A | 53 | BB | 93 | 29 | D3 | B2 |
| 14 | B4 | 54 | 6B | 94 | 52 | D4 | 79 |
| 15 | 75 | 55 | D6 | 95 | A4 | D5 | F2 |
| 16 | EA | 56 | B1 | 96 | 55 | D6 | F9 |
| 17 | C9 | 57 | 7F | 97 | AA | D7 | EF |
| 18 | 8F | 58 | FE | 98 | 49 | D8 | C3 |
| 19 | 03 | 59 | E1 | 99 | 92 | D9 | 9B |
| 1A | 06 | 5A | DF | 9A | 39 | DA | 2B |
| 1B | 0C | 5B | A3 | 9B | 72 | DB | 56 |
| 1C | 18 | 5C | 5B | 9C | E4 | DC | AC |
| 1D | 30 | 5D | B6 | 9D | D5 | DD | 45 |
| 1E | 60 | 5E | 71 | 9E | B7 | DE | 8A |
| 1F | C0 | 5F | E2 | 9F | 73 | DF | 09 |
| 20 | 9D | 60 | D9 | A0 | E6 | E0 | 12 |
| 21 | 27 | 61 | AF | A1 | D1 | E1 | 24 |
| 22 | 4E | 62 | 43 | A2 | BF | E2 | 48 |
| 23 | 9C | 63 | 86 | A3 | 63 | E3 | 90 |
| 24 | 25 | 64 | 11 | A4 | C6 | E4 | 3D |
| 25 | 4A | 65 | 22 | A5 | 91 | E5 | 7A |
| 26 | 94 | 66 | 44 | A6 | 3F | E6 | F4 |
| 27 | 35 | 67 | 88 | A7 | 7E | E7 | F5 |
| 28 | 6A | 68 | 0D | A8 | FC | E8 | F7 |
| 29 | D4 | 69 | 1A | A9 | E5 | E9 | F3 |
| 2A | B5 | 6A | 34 | AA | D7 | EA | FB |
| 2B | 77 | 6B | 68 | AB | B3 | EB | EB |
| 2C | EE | 6C | D0 | AC | 7B | EC | CB |
| 2D | C1 | 6D | BD | AD | F6 | ED | 8B |
| 2E | 9F | 6E | 67 | AE | F1 | EE | 0B |
| 2F | 23 | 6F | CE | AF | FF | EF | 16 |
| 30 | 46 | 70 | 81 | B0 | E3 | F0 | 2C |
| 31 | 8C | 71 | 1F | B1 | DB | F1 | 58 |
| 32 | 05 | 72 | 3E | B2 | AB | F2 | B0 |
| 33 | 0A | 73 | 7C | B3 | 4B | F3 | 7D |
| 34 | 14 | 74 | F8 | B4 | 96 | F4 | FA |
| 35 | 28 | 75 | ED | B5 | 31 | F5 | E9 |
| 36 | 50 | 76 | C7 | B6 | 62 | F6 | CF |
| 37 | A0 | 77 | 93 | B7 | C4 | F7 | 83 |
| 38 | 5D | 78 | 3B | B8 | 95 | F8 | 1B |
| 39 | BA | 79 | 76 | B9 | 37 | F9 | 36 |
| 3A | 69 | 7A | EC | BA | 6E | FA | 6C |
| 3B | D2 | 7B | C5 | BB | DC | FB | D8 |
| 3C | B9 | 7C | 97 | BC | A5 | FC | AD |
| 3D | 6F | 7D | 33 | BD | 57 | FD | 47 |
| 3E | DE | 7E | 66 | BE | AE | FE | 8E |
| 3F | A1 | 7F | CC | BF | 41 | FF | 01 |

The values corresponding to this table have been stored in the converters 136 and 137.

The converter 138 is used to obtain the error locations upon the decoding of p=2 and q=0. To obtain the error locations $i_1$ and $i_2$ from expression (17), $(\alpha^{i_1-i_2}+\alpha^{i_2-i_1})$ is first obtained from $\delta_1$ and $\delta_2$. By obtaining $(i_1-i_2)$ from this value, $i_1$ and $i_2$ will be known. The value of $(i_1-i_2)$ corresponding to $(\alpha^{i_1-i_2}+\alpha^{i_2-i_1})$ has been stored in the converter 138. This value can be obtained from the above-mentioned corresponding table between i and $\alpha^i$.

Figure 14:
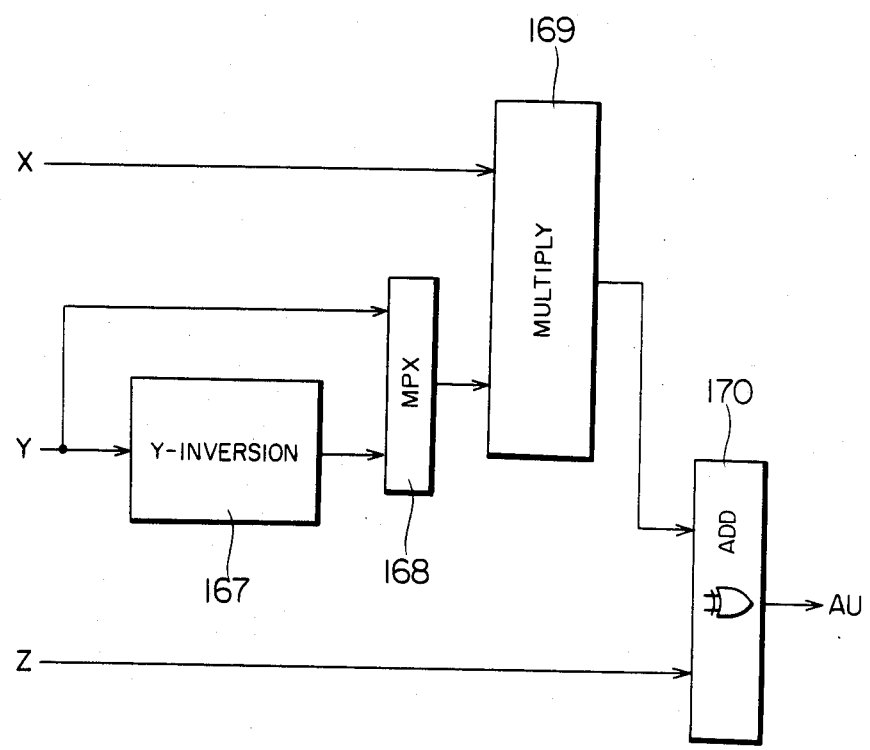
FIG. 14 is a diagram showing an arithmetic logic circuit over Galois field.

The arithmetic logic circuit 135 performs the multiplication, division and addition over the Galois field GF ($2^8$). This logic circuit 135 is constituted by such circuits as shown in FIG. 14. In FIG. 14, a numeral 167 denotes a circuit to obtain the reciprocal number of Y and an ROM or PLA is used; 168 is an MPX circuit; 169 is a multiplier which is constituted by an EOR and AND circuits; and 170 is an adder. The addition over the Galois field may be done by performing the EOR operation with respect to each bit. In the arithmetic logic circuit 135 of FIG. 14, when the MPX circuit 168 selects Y, the operation of $$X \cdot Y + Z$$

is performed; while, when it selects the reciprocal number of Y, the operation of $$X/Y + Z$$

is performed. In this way, by simultaneously performing the multiplication, division and addition, the number of times of operations upon decoding can be reduced, so that the decoding time can be shortened.

The comparator 142 is used to compare the above-mentioned numbers of flags with predetermined numbers and to compare the data during the decoding operation with constants.

The decoding is performed by controlling the above-mentioned memories 134 and 141, data converters 136, 137 and 138, arithmetic logic circuit 135, comparator 142, registers 149, and buffers 150 in accordance with the program stored in the program memory 146.

The address counter 145 determines the address of the program and advances the address of the program in response to the clock produced by the control circuit 144. The jump control circuit 148 determines the execution of the program jump on the basis of the result discriminated by the OR circuit 154 and comparator 142 and of the states of the flags stored in the memory 143. When jumping, the jump address is loaded to the address counter 145 in accordance with the discrimination result of the jump control circuit 148, thereby changing the address of the program.

Figure 15:
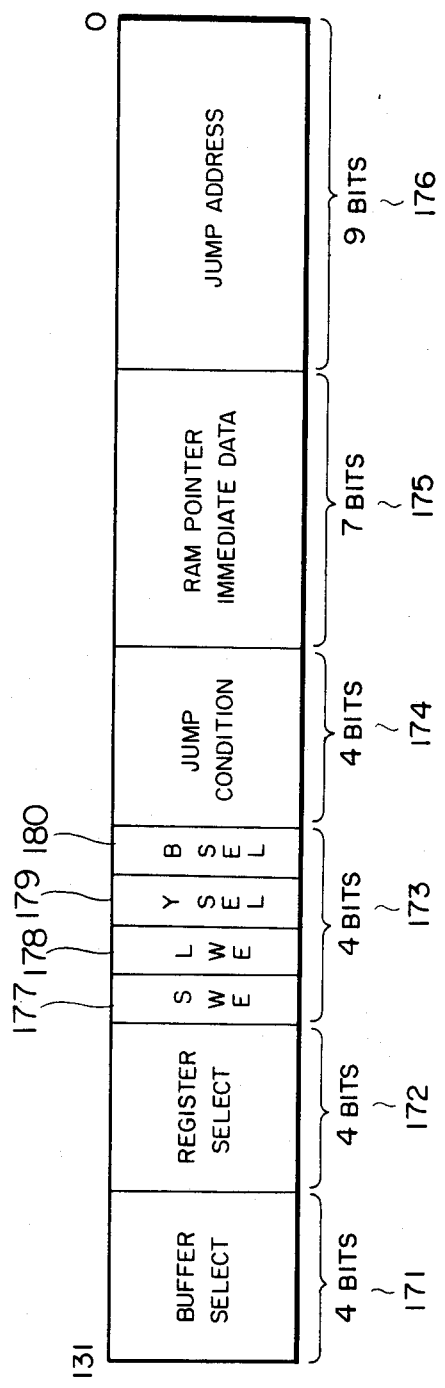
FIG. 15 is a diagram showing the program arrangement.

FIG. 15 shows the program arrangement. One word consists of 32 bits. A register selecting code 172 is used to select the register in which the data is stored among the registers 149 provided in the input section of each circuit. A buffer selecting code 171 is used to select the buffer from which the data is outputted among the buffers 150 provided in the output section of each circuit. The data can be transferred through the bus lines from arbitrary circuits to arbitrary circuits by these codes 171 and 172. SWE 177 and LWE 178 are used to write the data into the memories 134 and 141, respectively. YSEL 179 is used to select the multiplication and division in the arithmetic logic circuit 135. BSEL 180 is used to select an MPX circuit 153. The instruction field 175 is used to determine the addresses of the memories and the constants which are inputted to each bus line and comparators. The instruction field indicated at 174 is used to determine the jump condition of the program. In the jump control circuit 148, the content of the instruction field 174 is compared with the states of an OR circuit 154, comparator 142, memory 143, etc., thereby determining the execution of jump. The instruction field 176 is used to determine the jump address when jumping.

The contents of the buffer selecting code 171, register selecting code 172 and jump condition 174 are as follows.

| Code | Buffer | Register | Jump Conditional |
|------|--------|----------|------------------|
| 0 | — | — | — |
| 1 | S | DO | Unconditional Jump |
| 2 | SR | SR | C1/C2 |
| 3 | AU | X | NG |
| 4 | AI | Y | C = 0 |
| 5 | CD | Z | C ≠ 0 |
| 6 | DI | TR | A > B |
| 7 | — | — | A ≦ B |
| 8 | — | LO | I > N |
| 9 | F | FO | T > N |
| A | LR | LR | F(FA) = 0 |
| B | I | I | F(FA) ≧ 1 |
| C | T | FA | F(FA) ≧ 2 |
| D | CL | A | F(FA) = 3 |
| E | LI | B | F(FA) < 2 |
| F | — | N | F(FA) < 3 |

Figure 16B:
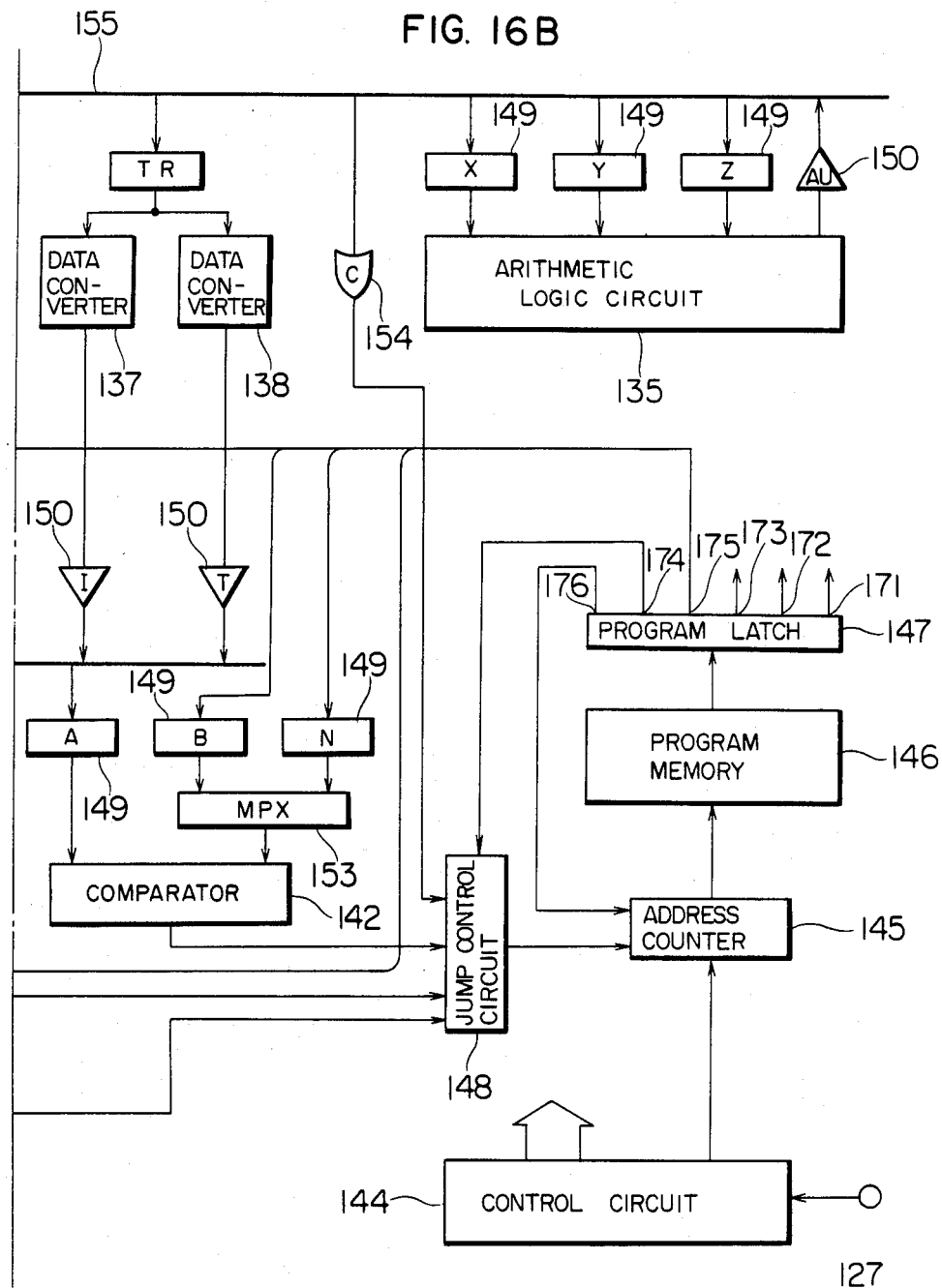

The denominations of the buffers and registers indicate 149 and 150 of FIGS. 16A and 16B. The jump conditions are defined such that "$C_1/C_2$" is for discrimination regarding whether the decoding is the first decoding or second decoding; "NG" is for discrimination regarding whether the input data was lost or not due to abnormality of the reproducing circuit; and "C=0" and "C≠0" are for discrimination regarding whether the output of the OR circuit 154 is 0 or not, namely, whether the data on the bus line 155 is 0 or not. In addition, codes 7 to 9 are used to make the determination on the basis of the result of comparison by the comparator 142. Codes A to F are used to make the determination on the basis of the content of the memory 143 corresponding to the address which is determined in dependence upon the value of the FA register. The flag information has been stored in the memory 143 as the two-bit data (0 to 3) as shown below.

| Code | $F_0$ | $F_1$ | $F_2$ |
|------|-------|-------|-------|
| 0 | 0 | 0 | 0 |
| 1 | 1 | 0 | 0 |
| 2 | 1 | 1 | 0 |
| 3 | 1 | 1 | 1 |

The data correction on the basis of the result of the decoding is also performed in accordance with the program. At 128 and 131 of FIG. 12, the error locations detected by the decoding are first outputted from the location input/output terminal 124 and the data corresponding to those locations are inputted from the data storing circuit 116. Then, the error correction shown in expression (10) is performed by the arithmetic logic circuit 135 and they are again written in the data storing circuit 116.

Upon correcting, the flag information is also outputted. The flag information is handled as the two-bit data instead of handling the $F_0$, $F_1$ and $F_2$ flags as they are. Upon decoding, the flag information as shown below is first stored in the FO register.

| Code | $C_1$ | $C_2$ |
|------|-------|-------|
| 0 | no error | no error |
| 1 | 1-word correction | uncorrectable (F = $F_1$) |
| 2 | 2-word correction | uncorrectable (F = $F_0$) |
| 3 | uncorrectable | uncorrectable (F = 1) |

In the first decoding, this flag information is outputted from the flag input/output terminal 125 to the flag storing circuit 118. Also, in the second decoding, the uncorrectable flag corresponding to this flag information is written in the data storing circuit 116 at 130 of FIG. 7.

The error correcting system according to this embodiment can execute the decoding of p=2 and q=0, the decoding of p=1 and q≦2, and the decoding of p=0 and q≦4, respectively, by about 80 to 100 steps. Also it can execute the decoding algorithm shown in FIGS. 4 and 5 including the data correction by steps of less than 150. On one hand, the program can be constituted by 384 words.

FIG. 16A and 16B show another embodiment of the error correcting system of the present invention. The memory 143 is omitted in the circuit of FIGS. 16A and 16B; this point is different from FIGS. 13A and 13B. In the circuit of FIGS. 13A and 13B, the flag information is stored in both memories 139 and 143. Therefore, by adding some decoding circuit, the memory can be commonly used. With such a circuit arrangement as shown in FIGS. 16A and 16B, the circuit scale can be more reduced.

As described above, in the error correcting system of this embodiment, since each circuit is controlled in accordance with the program it is also possible, by merely changing the program, to cope with the different error correction codes and decoding method in which the circuit scale is small. Further, the operation speed of the system may be lowered by performing the data input and decoding operations simultaneously.

The case will now be described where one embodiment of the arithmetic operation circuit over the Galois field which is used in the present invention is employed to GF ($2^3$).

The multiplying circuit over GF ($2^3$) will be first described.

When two variables A=($a_2$, $a_1$, $a_0$) and B=($b_2$, $b_1$, $b_0$) are expressed by polynomials, they are as follows.

$$A = a_2 x^2 + a_1 x + a_0$$

$$B = b_2 x^2 + b_1 x + b_0$$

When these polynomial expressions are used, the multiplication over the Galois field GF ($2^3$) which uses a primitive polynomial of $$F(x) = x^3 + x + 1$$

will be as follows.

$$A * B = (a_2 x^2 + a_1 x + a_2) \cdot (b_2 x^2 + b_1 x + b_0)$$

$$\mathrm{mod}\ (x^3 + x + 1)$$

$$= (a_2 b_2 + a_2 b_0 + a_1 b_1 + a_0 b_2) x^2 +$$

$$(a_2 b_2 + a_2 b_1 + a_1 b_2 + a_1 b_0 + a_0 b_1) x +$$

$$(a_2 b_1 + a_1 b_2 + a_0 b_0)$$

Therefore, assuming that $$C = (c_2, c_1, c_0) = A*B$$

we will have $$\begin{cases} c_2 = a_2 b_2 + a_2 b_0 + a_1 b_1 + a_0 b_2 \\ c_1 = a_2 b_2 + a_2 b_1 + a_1 b_2 + a_1 b_0 + a_0 b_1 \\ c_0 = a_2 b_1 + a_1 b_2 + a_0 b_0 \end{cases}$$

This arithmetic logic operation can be implemented by nine AND circuits and nine EOR circuits as shown in FIGS. 16A and 16B. In these diagrams, a reference numeral 208 denotes an A input terminal; 209 is a B input terminal; and 210 is a C output terminal.

Next, the dividing circuit for use in the invention will be explained. The division $$F = X/Y$$

can be modified as a following expression.

$$F = X * (1/Y)$$

Figure 18:
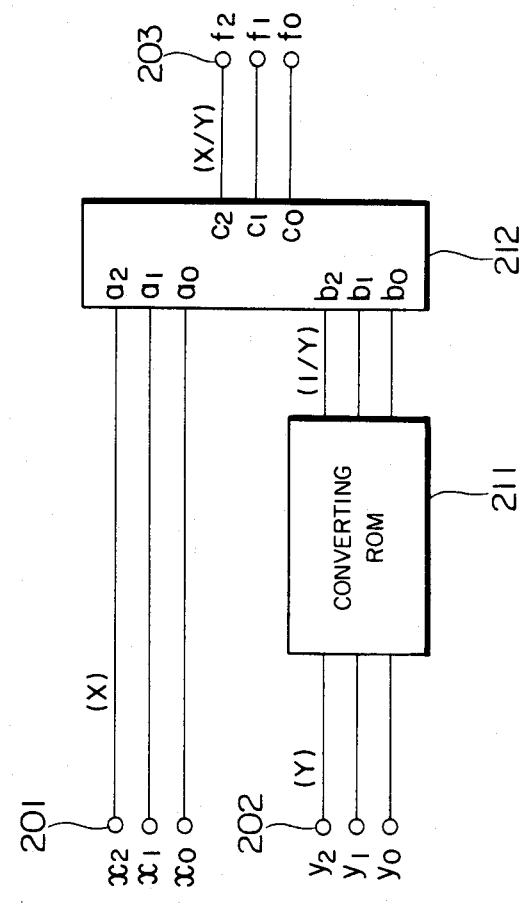
FIG. 18 is a diagram showing the dividing circuit which is suitable for use in the invention.

Therefore, by obtaining the reciprocal number (1/Y) of Y, the division can be performed by the circuit of FIG. 18.

In addition, the reciprocal number of Y is $\alpha^{(7-j)}$ and can be obtained by the converting ROM as shown in the below Table.

| Address | Data |
| --- | --- |
| 000 | — |
| 001 | 001 |
| 010 | 101 |
| 011 | 110 |
| 100 | 111 |
| 101 | 010 |
| 110 | 011 |
| 111 | 100 |

Figure 17:
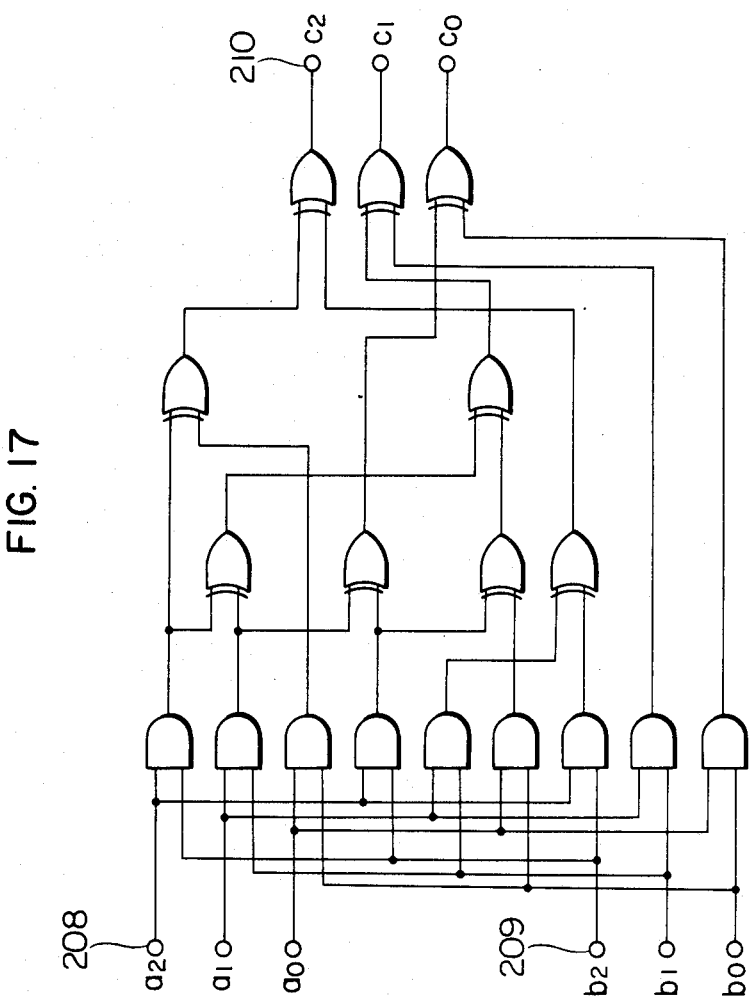
FIG. 17 is a diagram showing an example of an arrangement of the multiplying circuit which is used in the invention.

The dividing circuit which is used in the invention is shown in FIG. 18, in which a reference numeral 211 denotes a converting ROM having the content of the above converting table, and 212 is a multiplier shown in FIG.17.

An X data is inputted as it is to an A input terminal of the multiplier 212 and the reciprocal number of a Y data is inputted to a B input terminal, so that F=X/Y is outputted from a C output terminal.

In addition, in the converting ROM 211, the output regarding Y=(0 0 0) is not constant; however, since X/Y is not satisfied in case of Y=(0 0 0), no problem will be caused.

In the circuit of FIG. 18, since the X data passes through gates of only four stages and the Y data passes through only one ROM and gates of only three stages, it takes a short time for operation.

Further, since the arithmetic logic circuit of FIG. 16B is constituted by only one ROM, nine AND circuits and nine EOR circuits, the circuit scale is also small.

Figure 19:
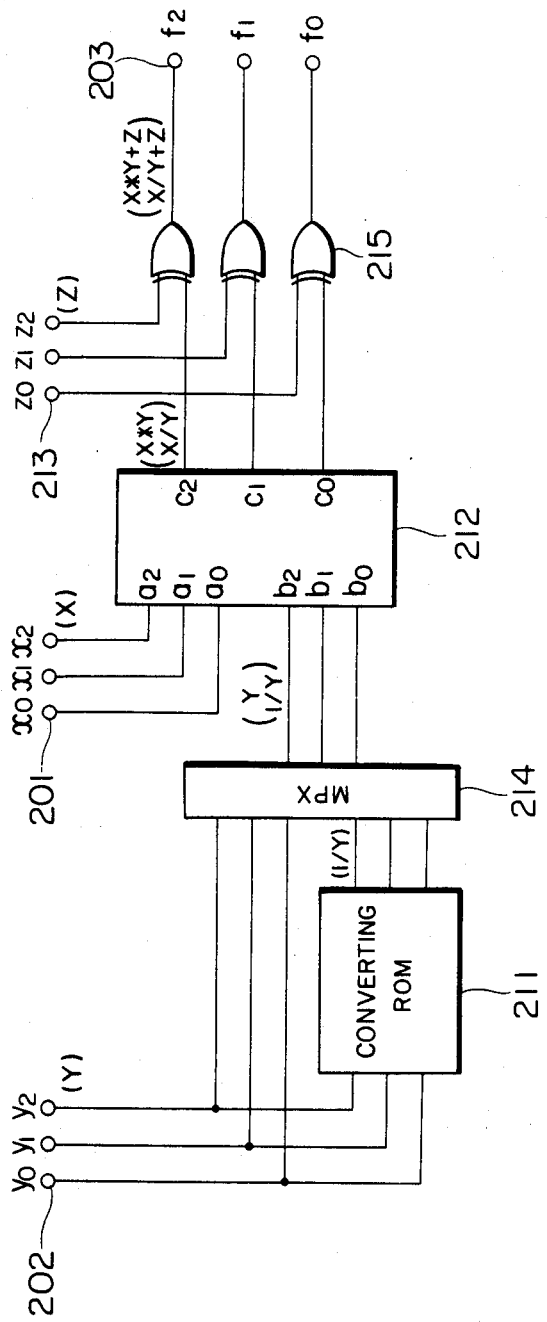
FIG. 19 is a diagram showing the arithmetic logic circuit for performing the composite operations which is suitable for use in the invention.

FIG. 19 shows another embodiment of the arithmethic logic circuit for use in the present invention.

In case of performing the complicated operation such as the decoding of the Reed Solomon codes, it is possible to reduce the number of operations if the composite operation of multiplication and addition, or the composite operation of division and addition, such as $$F = X * Y + Z \text{ or } F = X/Y + Z$$

is performed, rather than that the multiplication, division and addition are solely performed. In the circuit of FIG. 19, the multiplication and division of X and Y are performed in the multiplier 212 by converting the signal which is inputted to the B input terminal of the multiplier 212 to Y or 1/Y by an MPX 214.

Further, the C output of the multiplier 212 and the Z data which is inputted to an input terminal 213 are added by an EOR circuit 215.

In this way, the arithmetic logic operation result shown in the above expression is outputted from an output terminal 203.

As described above, the number of operations can be reduced by performing the composite operation of multiplication and addition or the composite operation of division and addition.

Figure 20:
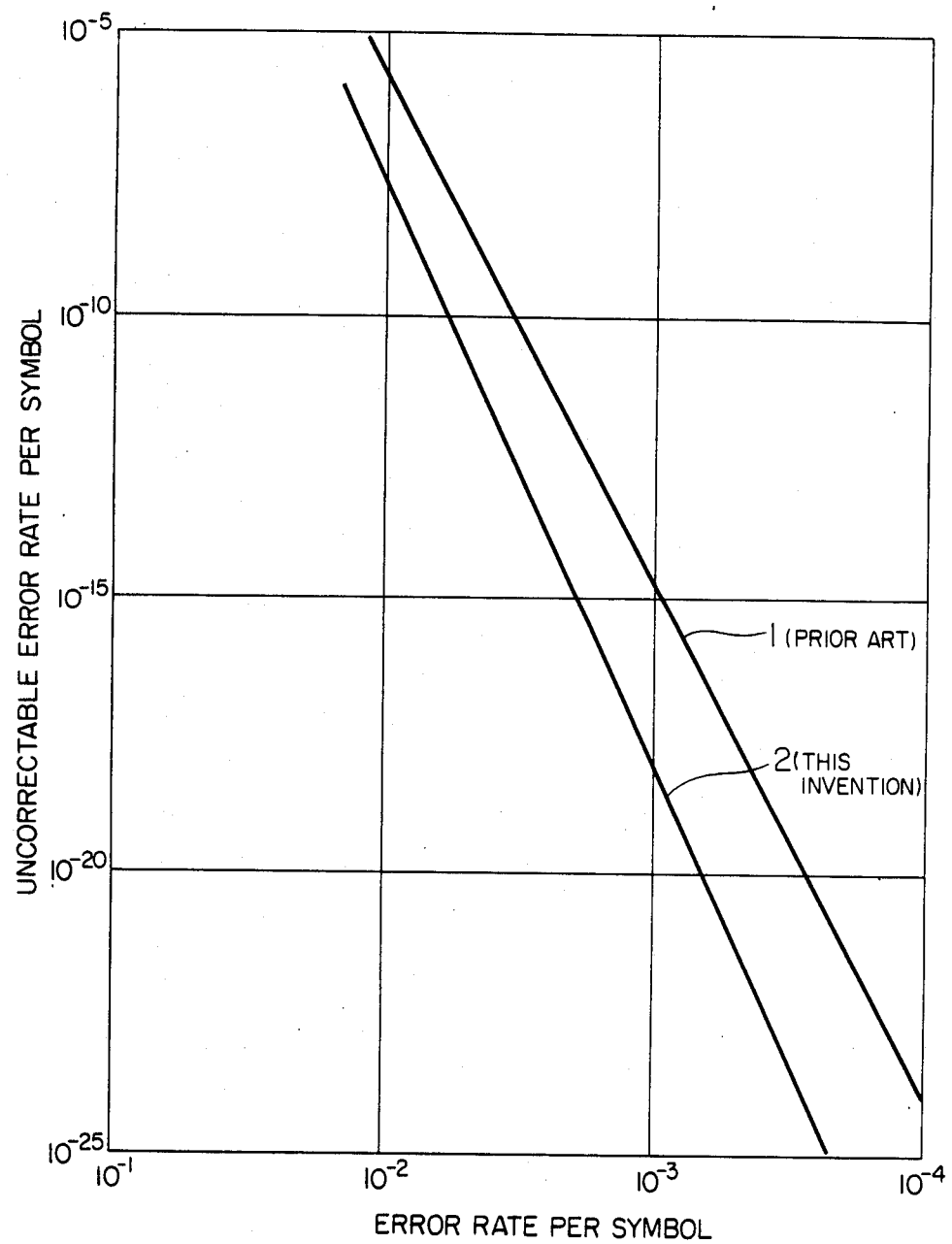
FIG. 20 shows a comparison diagram regarding the correcting capabilities by the present invention and the conventional example.

FIG. 20 shows an example of comparison in error correcting capability between the present invention and the prior art. In this characteristic diagram, an axis of abscissa indicates the error rate of the reproduction data and an axis of ordinate represents the error rate after error correction. Curve 1 indicates the error correcting capability by the prior art correcting method such as disclosed in the above-mentioned Sako et al, U.S. Pat. No. 4,437,185 and The Journal of The Institute of Electronics and Communication Engineers of Japan, J66-A, pages 284 to 285, March 1983. This correcting method is of the type in which only one flag, namely, one pointer code signal is added to each word signal at the initial decoding stage and two errors can be corrected at the subsequent decoding stage. Curve 2 represents the characteristics of the error correcting capability in the case where the invention is employed, in which up to three flag can be added to each word signal at the initial decoding stage. Curve 2 shows the case where the algorithm is adopted which uses three kinds of correcting methods of error correction, error and erasure correction, and erasure correction at the subsequent decoding stage. It will be appreciated from comparison of the curves 1 and 2 that the errors can be reduced to $1/10^{12}$ by the correction when the error rate is $10^{-3}$ in the former case and that they can be decreased to $1/10^{15}$ under the same condition in the latter case.

We claim:

1. An error correcting method of decoding code words, wherein first code blocks are formed by a plurality of information words in a first arrangement state and a plurality of first check words produced by codes associated with said plurality of information words with a Hamming distance of $d_1$, and second code blocks are formed by a plurality of information words and a plurality of first check words in a second arrangement state and including said plurality of information words and said plurality of first check words which are respectively included in the different first code blocks and by a plurality of second check words which are produced by codes associated with said plurality of information words and said plurality of first check words with a Hamming distance of $d_2$, comprising the steps of:
   (a) as a first decoding, at least detecting errors and at the same time adding flags indicative of the decoding states; and
   (b) as a second decoding, detecting errors and correcting, on the basis of a combination of $p_2$ and $q$ selected from their combinations satisfying $2p_2+q \leq d_1-1$, errors of $p_2$ words and erasures of $q$ words to which said flags were added with respect to said first code blocks.

2. An error correcting method according to claim 1, wherein said at least detecting errors includes detecting errors and correcting $p_1$ words satisfying $2p_1 \leq d_2-1$.

3. An error correcting method according to claim 1, wherein the number q of said correction words to which said flags were added is varied in accordance with the number of said flags included in said first code blocks which are subjected to said second decoding.

4. A system for correcting errors by the error correcting method according to claim 1, comprising:
   (a) syndrome generating means for producing syndromes in response to an input signal including information words and check words of one code block;
   (b) arithmetic logic circuit means for performing multiplication, division and addition over the Galois field using values of said syndrome produced by said syndrome generating means or using the values of said syndromes from said syndrome generating means and the locations of ones of the words to which said flags have been added to determine error locations and error patterns;
   (c) counter means for counting the number of a plurality of kinds of flags or information words and check words of each code block;
   (d) data memory means for storing the values of said syndromes, the result of the arithmetic operation by said arithmetic logic circuit means, the numbers of flags counted by said counter means, the locations of the input words to which said flags have been added, and the flags added to said input signal;
   (e) program memory means for storing a program for controlling said arithmetic logic circuit means and said data memory means so as to perform the error correcting operation and addition of flags; and
   (f) control means for determining in accordance with a program supplied from said program memory whether or not to jump the program on the basis of the numbers of flags counted by said counter means and the result of the arithmetic operation of said arithmetic logic circuit means stored in said data memory means.

5. An error correcting system for decoding an error correcting code or an error correcting code with flags indicating an error of the code word, said error correcting code being produced over the Galois field GF $(2^m)$ in which the code length is n words and the number of information words is $(n-k)$ and the number of check words is k, comprising:
   (a) syndrome generating means for producing k syndromes in response to an input signal including information words and check words of one code block;
   (b) arithmetic logic circuit means for performing the multiplication, division and addition over the Galois field using values of said syndromes produced by said syndrome generating circuit or using the values of the syndromes from said syndrome generating means and the locations of ones of the words to which flags have been added to determine error locations and error patterns;
   (c) counter means for counting the number of a plurality of kinds of flags for the information word and check word of each code block;
   (d) data memory means including at least one memory for storing the values of said syndromes, the result of the arithmetic operation by said arithmetic logic circuit means, the numbers of flags counted by said counter means, and the locations of flags added to said input signal;

(e) comparator means for comparing the numbers of flags counted by said counter means, and the result of the arithmetic operation by said arithmetic logic circuit means with predetermined numbers to determine the type of error correction to perform;

(f) program memory means for storing a program for controlling said arithmetic logic circuit means, said data memory means and said comparator means so as to perform the error correcting operation and addition of flags;

(g) first control means for determining in accordance with a program supplied from said program memory means whether or not to jump the program on the basis of the numbers of flags counted by said counter means and the result of the operation of said arithmetic logic circuit means; and (h) second control means for controlling said syndrome generating means, said counter means and said data memory means storing the flags added to said input signal to enable data inputting independently of the error correcting operation.

* * * * *